United States Patent
Bando et al.

(10) Patent No.: US 8,060,303 B2
(45) Date of Patent: Nov. 15, 2011

(54) NAVIGATION DEVICE AND LANE GUIDE METHOD

(75) Inventors: Mikio Bando, Kanagawa (JP); Masao Sakata, Kanagawa (JP)

(73) Assignee: Xanavi Informatics Corporation, Kanagawa-ken (JP)

( * ) Notice: Subject to any disclaimer, the term of this patent is extended or adjusted under 35 U.S.C. 154(b) by 531 days.

(21) Appl. No.: 12/174,834

(22) Filed: Jul. 17, 2008

(65) Prior Publication Data

US 2009/0024321 A1    Jan. 22, 2009

(30) Foreign Application Priority Data

Jul. 17, 2007  (JP) ................................. 2007-185446

(51) Int. Cl.
G08G 1/0968  (2006.01)
G01C 21/36  (2006.01)

(52) U.S. Cl. ..................... 701/210; 701/209; 340/995.1; 455/414.1

(58) Field of Classification Search .................. 701/210, 701/211, 213, 209, 208; 340/995.1, 995.19; 455/414.1; 348/148
See application file for complete search history.

(56) References Cited

U.S. PATENT DOCUMENTS

| | | | | |
|---|---|---|---|---|
| 5,490,079 A * | 2/1996 | Sharpe et al. | ................. | 705/418 |
| 5,991,689 A * | 11/1999 | Aito et al. | ..................... | 701/209 |
| 6,233,519 B1 * | 5/2001 | Yamada | ........................ | 701/200 |
| 2001/0021895 A1 * | 9/2001 | Yamazaki | .................... | 701/211 |
| 2003/0023369 A1 * | 1/2003 | Takashima | .................... | 701/208 |
| 2004/0181336 A1 * | 9/2004 | Omi | .............................. | 701/209 |
| 2005/0267679 A1 * | 12/2005 | Tajima | .......................... | 701/209 |
| 2009/0024320 A1 * | 1/2009 | Nakamura et al. | ........... | 701/210 |

FOREIGN PATENT DOCUMENTS

JP    2000-146598    5/2000

* cited by examiner

*Primary Examiner* — Tan Q Nguyen

(74) *Attorney, Agent, or Firm* — Antonelli, Terry, Stout & Kraus, LLP.

(57) ABSTRACT

A vehicle is guided to a lane that the vehicle should run, even if map data do not include lane information of a tollgate.

A navigation processing part 100 makes a vehicle running path calculation part 112 calculate a running path of the vehicle from a point of a prescribed distance from the tollgate until an ETC receipt signal receiving part 114 receives an ETC receipt signal. Then, the navigation processing part 100 calculates an approximate position of an ETC lane on the basis of the running path, and accumulates the calculated approximate position in a storage unit. Further, when the vehicle approaches to the tollgate within a prescribed distance from the tollgate, the navigation processing part 100 obtains the approximate position of the ETC lane of the tollgate from the storage unit, and displays the approximate position through a display processing part 106, to guide the user to the ETC lane.

10 Claims, 22 Drawing Sheets

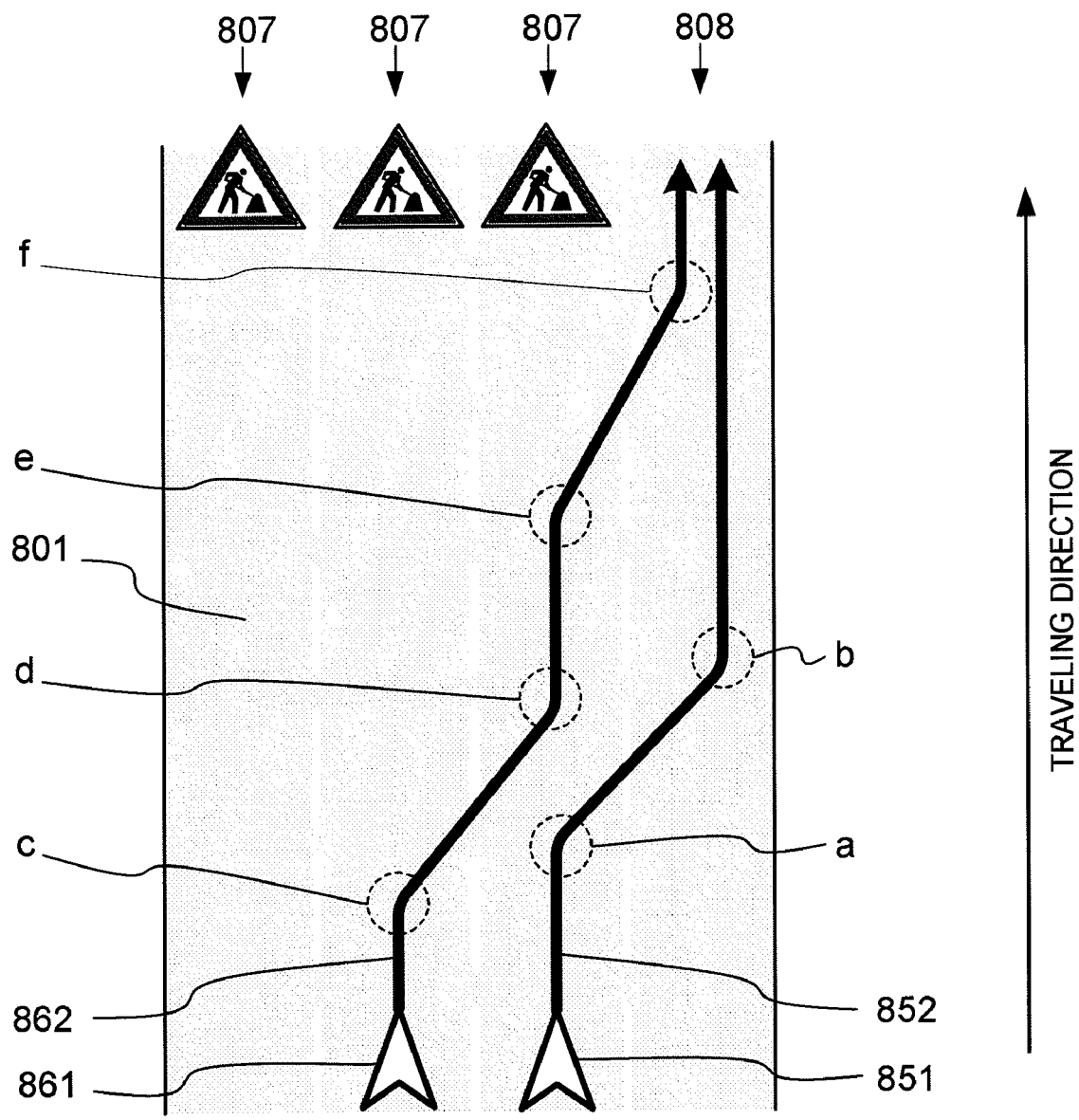

NAVIGATION DEVICE AND LANE GUIDE METHOD

BACKGROUND OF THE INVENTION

The present invention relates to a navigation device mounted on a vehicle or the like, and particularly to a technique for giving guidance to an Electronic Toll Collection (ETC) lane at a tollgate.

As Intelligent Transport Systems (ITS) develop, an ETC system (a system for collecting a toll without stopping a vehicle) is introduced to a toll road such as an expressway. Accordingly, lanes (hereinafter, referred to as ETC lanes) adapted for ETC are provided at a tollgate.

However, not all vehicles are mounted with an in-vehicle ETC unit. Further, in some vehicles, an ETC card may not be set in the in-vehicle ETC unit although they are mounted with the unit. Thus, a tollgate also has conventional lanes for collecting a toll by hand as in the past.

Thus, there is known a technique (Patent Document 1) that considers mixture of ETC lanes and conventional lanes to guide a vehicle to an ETC lane by using information on lane layouts, which has been previously stored or is acquired by communication with a tollgate.

Patent Document 1: Japanese Un-examined Patent Application Laid-Open No. 2000-146598

According to the above-described technique, a navigation device should previously have information on a lane layout of each tollgate or map data including route information (such as links) for leading to each lane.

Thus, a navigation device without such map data can not guide a vehicle to a lane to run. Further, in order to incorporate new information such as the above-described information to already-provided map data, it is necessary to change the map data. This takes time and entails cost.

Further, in the case of a technique where an ETC system transmits information on a lane layout, the ETC system itself should have antennas used for communication according to Dedicated Short Range Communication (DSRC) or the like.

Thus, in the case where an ETC system does not have such antennas, a navigation device can not guide a vehicle to a lane to run. Further, it takes time and entails cost for an ETC system to have such antennas.

In the present period of spreading of an ETC system, it is difficult to prepare map data furnished with sufficient lane information previously, and it is costly and takes time to accommodate such map data to the ETC systems of the whole of a country. Further, it takes time and entails cost also to improve the ETC systems of the whole of a country such that the ETC systems can transmit information on lane layouts.

Thus, an object of the present invention is to provide a technique for guiding a vehicle to a lane to run even if the navigation device uses map data that does not include lane information.

SUMMARY OF THE INVENTION

To solve the above problem, an apparatus invention mode of the present invention provides a navigation device comprising: a calculation part, which uses information on a traveling direction of a vehicle to calculate an approximate position of a lane of a prescribed kind with respect to the traveling direction; a storage part, which stores the approximate position of the lane of the prescribed kind; and an output part, which obtains the approximate position of the lane of the prescribed kind from the storage part, and outputs the obtained approximate position.

The above navigation device may be characterized in that the navigation device further comprises an ETC signal receiving part, which receives an ETC signal indicating that the navigation device has communicated with an ETC system placed in an ETC lane; the calculation part calculates an approximate position of the ETC lane on a basis of a position of the vehicle when the ETC signal is received; and the output part obtains an approximate position of an ETC lane at a designate tollgate, and outputs the obtained approximate position.

Further, the navigation device may be characterized in that the navigation device further comprises a traffic information receiving part, which receives information on traffic regulation of a road; the calculation part calculates, on a basis of a position of the vehicle, an approximate position of a lane different from a regulated lane under traffic regulation, when the regulated lane exists among prescribed lanes of a road that the vehicle is running; and the output part obtains the approximate position of the lane different from the regulated lane from the storage part, and outputs the obtained approximate position.

Further, the navigation device may be characterized in that the approximate position is information including "right" or "left".

Further, the navigation device may be characterized in that the output part uses the approximate position of the lane to display a guide screen that indicates a traveling direction to the lane in question is right or left.

Further, the navigation device may be characterized in that the output part display a guide screen that comprises lanes on right and left side with respect to the traveling direction and a figure for leading to a lane corresponding to the approximate position between the lanes.

Further, the navigation device may be characterized in that the output part uses the approximate position of the lane to output voice for informing that a traveling direction to the lane in question is right or left.

Further, the navigation device may be characterized in that information on the traveling direction of the vehicle is a running path obtained from a time course of a present location of the vehicle between specified points; and the calculation part calculates the approximate position of the lane such that the approximate position is located in a direction in which the running path has deviated from a link corresponding to a road that the vehicle is running.

An another apparatus invention mode of the present invention provides a navigation device comprising: a calculation part, which uses information on a traveling direction of a vehicle to calculate an approximate position of a lane of a prescribed kind with respect to the traveling direction; a lane position sending part, which sends the approximate position of the lane of the prescribed kind to a prescribed external apparatus; a lane position receiving part, which receives an approximate position of the lane of the prescribed kind from the prescribed external apparatus; a storage part, which stores the calculated approximate position of the lane of the prescribed kind and the received approximate position of the lane of the prescribed kind; and an output part, which obtains the stored approximate position of the lane of the prescribed kind from the storage part, and outputs the obtained approximate position.

A method invention mode of the present invention provides a lane guide method for a navigation device, wherein: the navigation device performs: a calculation step, in which information on a traveling direction of a vehicle is used for calculating an approximate position of a lane of a prescribed kind with respect to the traveling direction; a storage step, in which the approximate position of the lane of the prescribed kind is stored; and an output step, in which the approximate position of the lane of the prescribed kind, which is obtained in the storage step, is obtained and outputted.

BRIEF DESCRIPTION OF THE DRAWINGS

FIG. 23 is a schematic view showing an example of an actual road.

DETAILED DESCRIPTION

First Embodiment

Figure 1:
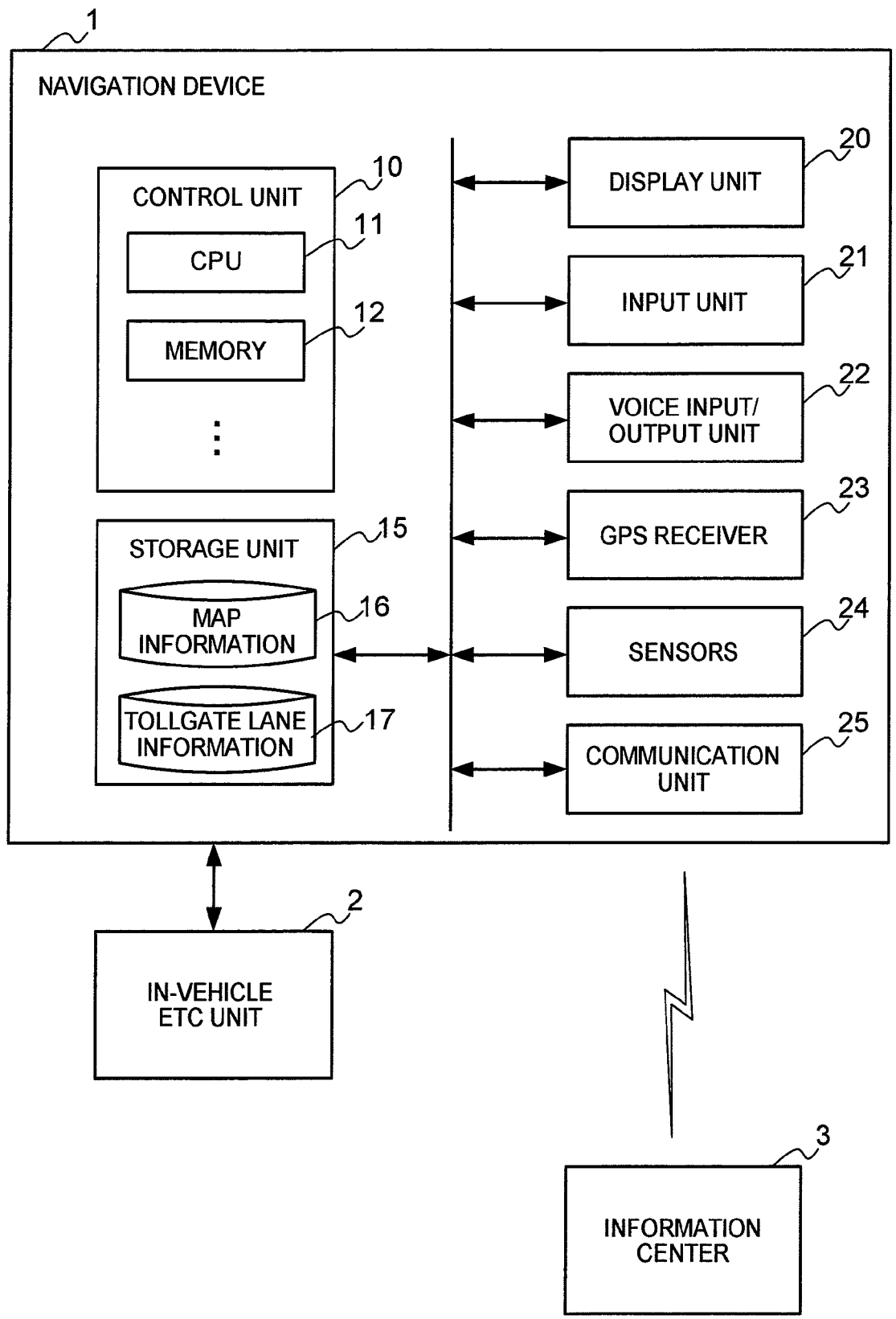
FIG. 1 is a block diagram showing an outline of a system configuration as well as a hardware configuration of a navigation device according to a first embodiment of the present invention.

In the following, a first embodiment of the present invention will be described referring to the drawings.

FIG. 1 is a block diagram showing an outline of a system configuration as well as a hardware configuration of a navigation device according to the first embodiment of the present invention.

As shown in the figure, in this system, the navigation device 1 is coupled with an in-vehicle ETC unit 2. Further, the navigation device 1 is connected to an information center 3.

The in-vehicle ETC unit 2 is a device that communicates with an ETC system (not shown) at a tollgate by radio, to exchange information (information on the vehicle, the ETC card number, the entrance tollgate, the exit tollgate, a toll, and the like) required for toll adjustment and the like, and performs processing such as toll adjustment. Further, the in-vehicle ETC unit 2 sends, for example, toll information and the like to the navigation device 1. The sent information is displayed on the navigation device 1.

The information center 3 is an apparatus that communicates with the navigation device 1 by radio, to send traffic jam information, weather information, E-mail, and the like to the navigation device 1. Further, the information center 3 collects traffic jam information from navigation devices and statistically analyzes the collected traffic jam information to supplement the traffic jam information.

The navigation device 1 is a device that performs navigation processing such as route guidance by providing information to a user, i.e., for example, by displaying map information, route information, traffic jam information and the like and by displaying ETC information. The navigation device 1 comprises a control unit 10, a storage unit 15, a display unit 20, an input unit 21, a voice input/output unit 22, a Global Positioning System (GPS) receiver 23, various sensors 24, and a communication unit 25. These component units of the navigation device 1 are connected with one another.

The control unit 10 is a central unit that controls the above-mentioned units and performs various kinds of processing. The control unit 10 comprises a Central Processing Unit (CPU) 11, a memory 12 such as a Random Access Memory (RAM) and a Read Only Memory (ROM).

The control unit 10 calculates the present location by using information outputted from the GPS receiver and the various sensors 24. Further, based on the obtained present location information, the control unit 10 reads map information 16 required for display from the storage unit 15. Further, the control unit 10 performs graphics expansion of the read map information 16, and superimposes a mark for indicating the present location on the expanded map information, to display the result on the display unit 20. Further, the control unit 10 calculates the best route (i.e. a recommended route) connecting a departure point (the present location) indicated by the user and a destination by using the map information 16, and displays the calculated best route on the display unit 20.

Further, the control unit 10 displays information on ETC lanes by using tollgate lane information 17 stored in the storage unit 15 and information received from the in-vehicle ETC unit 2. Further, the control unit 10 uses the voice input/output unit 22 to output voice for guiding the user. Further, the control unit 10 receives a user's request through the input unit 21 and performs processing that responds to the request. Further, the control unit 10 receives traffic information or the like from the information center 3 through the communication unit 25 and displays the received information.

The storage unit 15 stores programs and data required for the control unit 10 to perform various kinds of processing, the map information 16 and the tollgate lane information 17 used for the navigation processing, a voice dictionary (not shown) used for voice recognition, and the like. The storage unit 15 comprises a Hard Disk Drive (HDD) or the like, for example.

Figure 2:
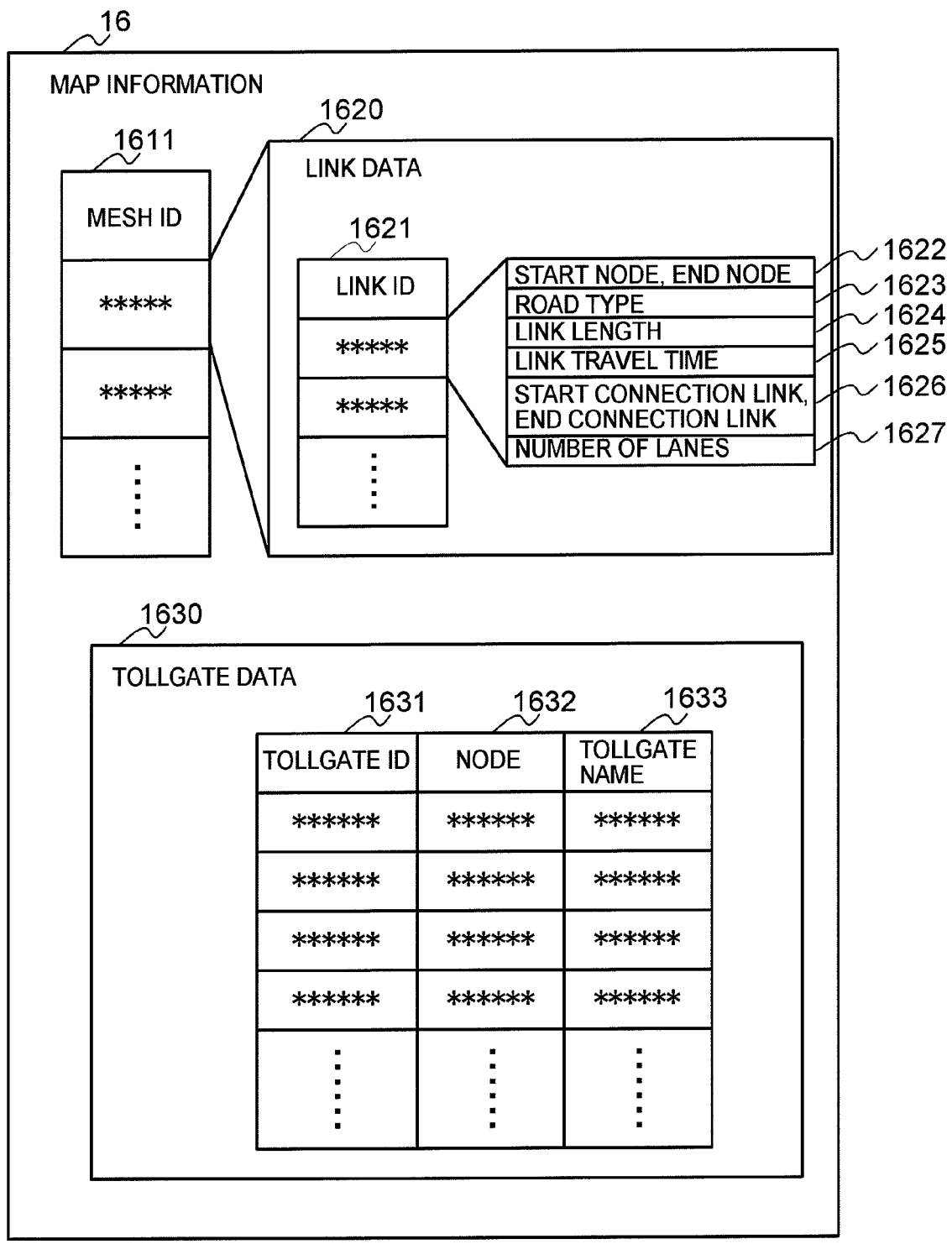
FIG. 2 is a diagram for explaining an example of data structure of map information.

As shown in FIG. 2, for each identification code (a mesh ID) of a mesh (i.e. a partitioned area) on a map, the map information 16 includes link data 1620 on links constituting each road included in that mesh area.

For each link ID 1621, the link data 1620 includes coordinate information 1622 of two nodes (a start node and an end node) constituting the link, road type information 1623 of a road including the link, link length information 1624 indicating the length of the link, link travel time 1625, link IDs (connection link IDs) 1626 of respective links connecting to the two nodes, number-of-lanes 1627 indicating the number of lanes included in the link, and the like. The road type information 1623 of a link stores information indicating whether the road is a toll road or not.

Further, the map information 16 includes tollgate data 1630. The toll gate data 1630 stores, for each tollgate, a code (a tollgate ID) 1631 identifying the tollgate, coordinate information 1632 of a node of the tollgate, and a tollgate name 1633, as information associated with that tollgate.

Figure 3:
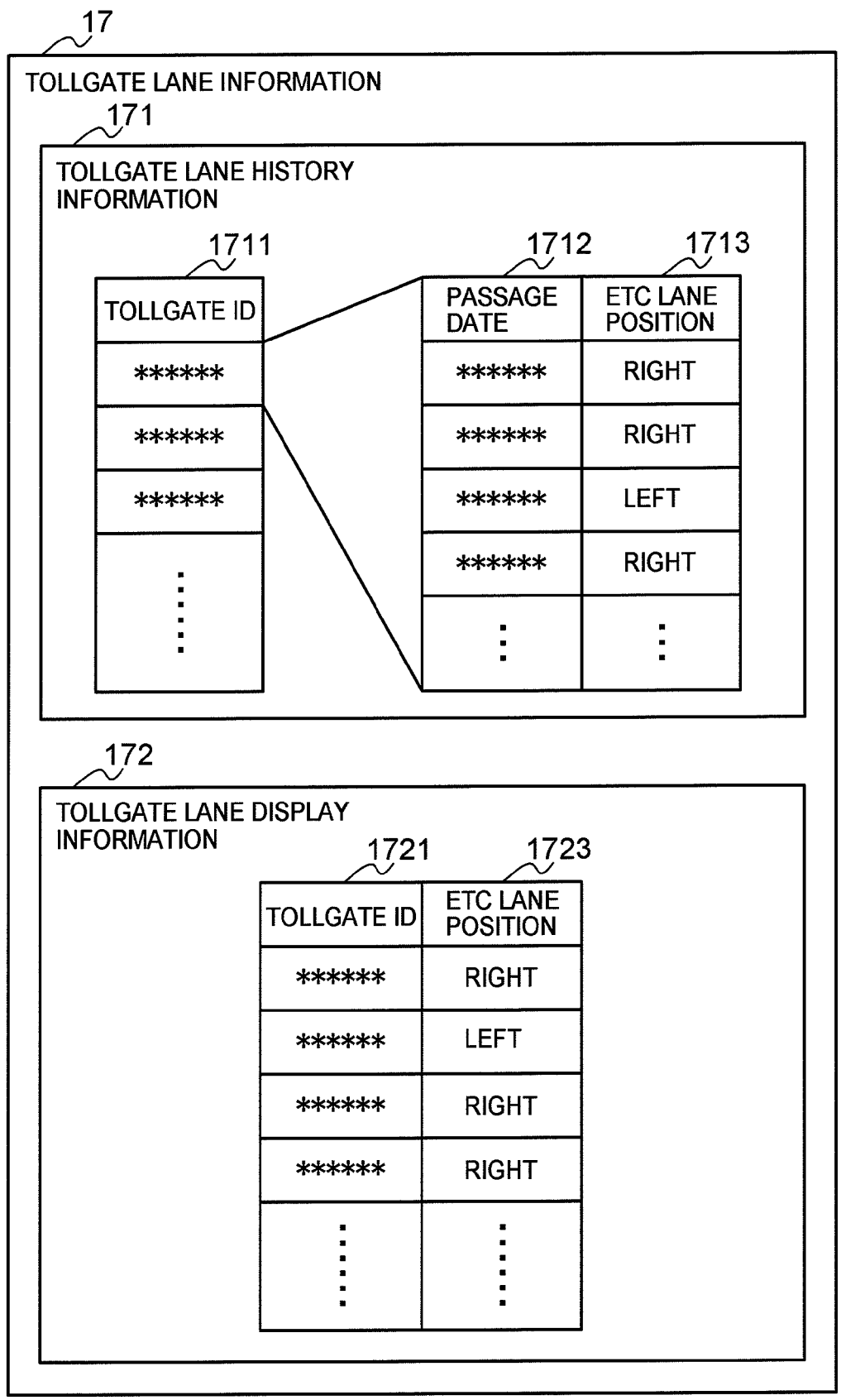
FIG. 3 is a diagram for explaining an example of data structure of tollgate lane information.

The tollgate lane information 17 accumulates lane position information calculated by the below-described ETC lane learning processing, and is used in the navigation processing by the control unit 10. As shown in FIG. 3, the tollgate lane information 17 includes tollgate lane history information 171 and tollgate lane display information 172.

The tollgate lane history information 171 stores, for each tollgate, an approximate position of an ETC lane through which a vehicle ran. In detail, the tollgate lane history information 171 stores, for each code (a tollgate ID) 1711 that identifies a tollgate, one or more pieces of information associated with that tollgate ID 1711, with each piece comprising a passage date 1712 and an ETC lane position 1713. A method of calculating an approximate position will be described later.

Based on the ETC lane position 1713 in the tollgate lane history information 171, the tollgate lane display information 172 stores a position determined by a prescribed method (for example, a method that selects a position included in the most pieces of information stored), as an ETC lane position used for the navigation processing. In detail, the tollgate lane display information 172 stores a tollgate ID 1721 and an ETC lane position 1723 for each tollgate. The tollgate lane display information is used for displaying an approximate position of an ETC lane to guide a user.

Returning to FIG. 1, description will be continued. The display unit 20 is a device that displays graphics information generated by the control unit 10, and for example comprises a liquid crystal display.

The input unit 21 is a device for receiving an instruction from a user. The input unit 21 comprises, for example, a touch panel stuck on a screen of the display unit 20, a joystick, hard switches such as a keyboard, and/or the like.

The voice input/output unit 22 converts a message generated for a user by the control unit 10 into a voice signal, and outputs the voice signal. Further, the voice input/output unit 22 recognizes a voice produced by a user and transfers the content of the recognized voice to the control unit 10.

The GPS receiver 23 is a device for receiving signals from GPS satellites and for generating position information indicating the present location of the vehicle. The generated position information is sent to the control unit 10 and used there for the navigation processing.

The sensors 24 are devices for collecting data that are used for calculating the present location of the vehicle, and for example include a speed sensor, a gyro sensor, and the like. The collected data are sent to the control unit 10 and used there for the navigation processing.

The communication unit 25 is a device for communicating with the information center 3. The communication unit 25 comprises, for example, an ordinary portable telephone, and sends and receives information such as traffic jam information, weather information, and E-mail.

Figure 4:
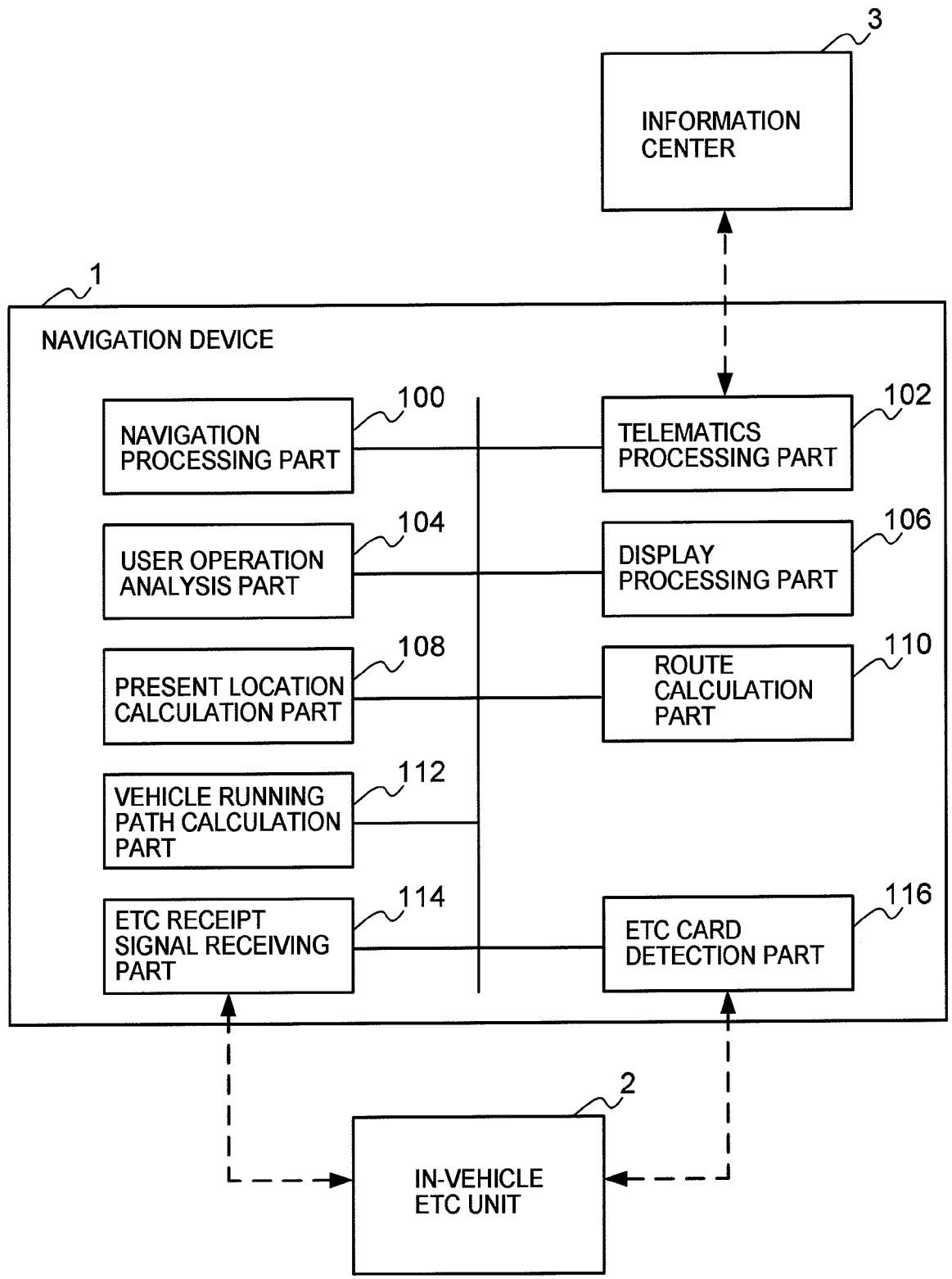
FIG. 4 is a block diagram showing a configuration of functions that a navigation device has.

FIG. 4 is a block diagram showing a configuration of functions that the navigation device 1 has.

As shown in the figure, the navigation device 1 comprises a navigation processing part 100, a telematics processing part 102, a user operation analysis part 104, a display processing part 106, a present location calculation part 108, a route calculation part 110, a vehicle running path calculation part 112, an ETC receipt signal receiving part 114, and an ETC card detection part 116. These functional parts are realized when the CPU 11 loads programs and data required for execution of the programs from the storage unit 15 into the memory 12 and executes the programs.

The telematics processing part 102 communicates with the information center 3 by using the communication unit 25. In detail, the telematics processing part 102 receives information such as traffic jam information, weather information and E-mail from the information center 3, and sends the received information to the navigation processing part 100. Further, the telematics processing part sends designated information to the information center 3. The traffic jam information and the like are displayed on the display unit and used for the navigation processing.

The user operation analysis part 104 receives user's operation inputted through the input unit 21, analyzes the operation content, and controls other functional parts such that processing corresponding to the operation content is performed. Further, the user operation analysis part 104 analyzes words inputted and recognized through the voice input/output unit 22, to obtain a corresponding operation content. Then, the user operation analysis part 104 controls other functional parts such that processing corresponding to the operation content is performed. For example, when a user requests search for a recommended route, the user operation analysis part 104 requests the navigation processing part 100 to perform processing of displaying map information and dialogue for receiving designation of a destination.

The display processing part 106 receives an instruction from another functional part, and generates and outputs rendering commands for making the display unit 20 display a screen. For example, the display processing part 106 generates map drawing commands so as to render roads, other map elements, the present location, the destination, and marks such as arrows indicating the recommended route on a designated scale and by a designated rendering method.

The present location calculation part 108 calculates the present location by using information outputted from the GPS receiver 23 and the various sensors 24 at prescribed intervals (for example, at intervals of a prescribed distance or a prescribed period of time). The calculated present location is sent to the navigation processing part 100, the route calculation part 110, the vehicle running path calculation part 112 and the like, to be used for processing in those parts.

The route calculation part 110 searches for a recommended route that connects designated two points (the present location and a destination). In detail, first the route calculation part 110 obtains the present location from the present location calculation part 108 and a destination received through the input unit 21. Then, using the Dijkstra's algorithm or the like, the route calculation part 110 searches for a route along which the total cost becomes lowest among the routes connecting the two points (the present location and the destination) by converting a road (a link) connecting prescribed points (nodes) into a link cost (for example, a distance or a travel time). Traffic information or the like obtained through the telematics processing part 102 may be used for the route search.

The vehicle running path calculation part 112 calculates a running path of the vehicle from the point at which the vehicle enters a prescribed range (for example, within 500 m) from a tollgate until the vehicle passes through the tollgate. In detail, using the map information 16 and the present location information outputted by the present location calculation part 108, the vehicle running path calculation part 112 monitors whether the vehicle has shifted to the lane on the right or left side, or whether the vehicle proceeds slantingly toward the right or left side, for example. Here, it is assumed that the processing of calculating the running path of the vehicle is performed separately from and in the background of the navigation processing.

The ETC receipt signal receiving part 114 receives, from the in-vehicle ETC unit 2, a signal (hereinafter, referred to as an ETC receipt signal) indicating that a toll has been paid, and notifies the navigation processing part 100 to that effect.

The ETC card detection part 116 obtains, from the in-vehicle ETC unit 2, information indicating whether an ETC card has been loaded or not, and sends the information as an ETC card load state to the navigation processing part 100.

The navigation processing part 100 performs the navigation processing for guiding a user. In detail, based on the present location information calculated by the present location calculation part 108, the navigation processing part 100 reads the map information of the neighborhood of the present location from the storage unit 15. Then, the navigation processing part 100 superimposes the present location information and the route information calculated by the route calculation part 110 on the read map information, and displays the result on the display unit 20. Also, information such as the traffic jam information obtained from the information center 3 through the telematics processing part 102 may be displayed. Further, the navigation processing part 100 outputs voice, for example, for leading the vehicle to the traveling direction, by using the voice input/output unit 22.

Further, the navigation processing part 100 performs processing for guiding the vehicle loaded with an ETC card to an ETC lane. In detail, using the present location information calculated by the present location calculation part 108 and the map information 16 (the link data 1620 and the tollgate data 1630) of the neighborhood of the present location, the navigation processing part 100 detects that the present location of the vehicle becomes within a prescribed range (for example, within 500 m) from a tollgate, and reads the tollgate lane display information 172 of that tollgate from the storage unit 15. Then, according to the ETC lane position 1723 of the read tollgate lane display information 172, the navigation processing part 100 displays, on the display unit 20, an image showing the traveling direction in which the vehicle should run. Further, the navigation processing part 100 outputs voice, for example, for leading the vehicle to the traveling direction, by using the voice input/output unit 22.

Further, the navigation processing part 100 learns the ETC lane position of the tollgate that has been passed through. In detail, when the navigation processing part 100 detects that the present location of the vehicle becomes within a prescribed range (for example, within 500 m) from a tollgate by using the present location information calculated by the present location calculation part 108 and the map information of the neighborhood of the present location, then the navigation processing part 100 makes the vehicle running path calculation part 112 monitor the running path of the vehicle. Then, when the navigation processing part 100 detects, through the ETC receipt signal receiving part 114, that the toll payment has been finished, then the navigation processing part 100 obtains an approximate position of the ETC lane on the basis of the running path of the vehicle and stores the obtained approximate position in the tollgate lane history information 171 in the storage unit 15. Further, using the tollgate lane history information 171, the navigation processing part 100 determines a position by a prescribed method (for example, a method that selects a position included in the most pieces of information stored) and stores the determined position in the tollgate lane display information 172.

Next, referring to FIGS. 5-8, two characteristic operations (ETC lane guide processing and ETC lane learning processing) of the navigation device 1 will be described.

Figure 5:
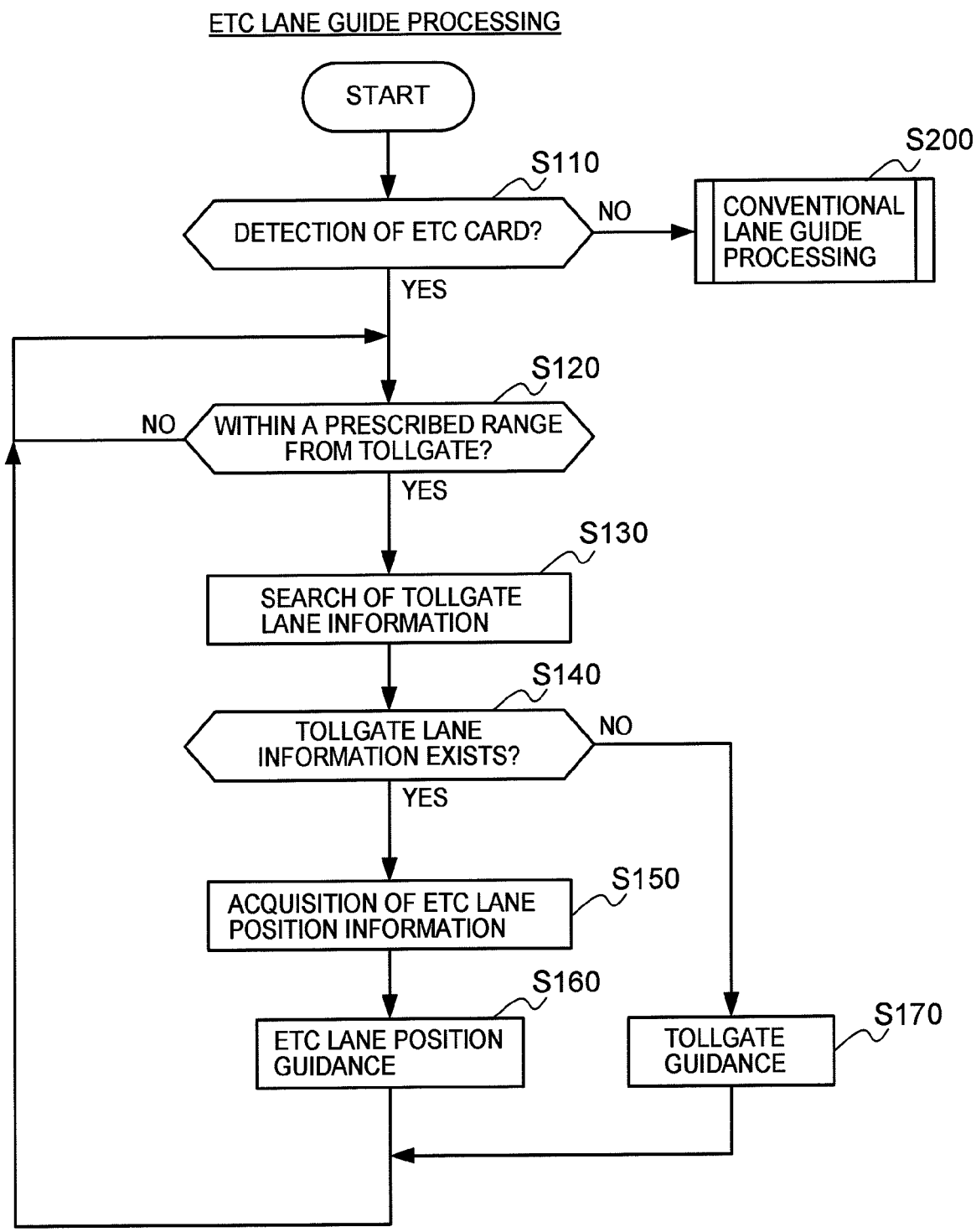
FIG. 5 is a flowchart showing a flow of processing of guiding a user to an ETC lane (ETC lane guide processing)

FIG. 5 is a flowchart showing a flow of the processing of guiding a user to an ETC lane (the ETC lane guide processing).

When the navigation device 1 and the in-vehicle ETC unit 2 are activated by, for example, turning on the ignition switch, first the navigation processing part 100 obtains an ETC card load state through the ETC card detection part 116, to judge whether an ETC card has been loaded or not (S110). When it is judged that an ETC card has been loaded (YES in S110), then the flow proceeds to S120. On the other hand, when it is judged that an ETC card has not been loaded (NO in S110), then conventional lane guide processing (S200) is started.

While the vehicle is running, the navigation processing part 100 monitors whether the vehicle comes within a prescribed range from a tollgate (S120). In detail, the navigation processing part 100 obtains the present location information calculated by the present location calculation part 108 and the map information 16 of the neighborhood of the present location periodically (for example, at intervals of a prescribed period time or a prescribed distance), to judge whether a tollgate exists within the prescribed distance (for example, 500 m). When it is judged that a tollgate exists within the prescribed distance (YES in S120), then the flow proceeds to S130. On the other hand, when it is judged that a tollgate does not exist within the prescribed distance (NO in S120), the flow returns to S120.

When it is judged that a tollgate exists within the prescribed distance (YES in S120), the navigation processing part 100 searches the tollgate lane information 17 of the tollgate in question for guiding the user to an ETC lane (S130). In detail, the navigation processing part 100 obtains the tollgate ID 1631 of the tollgate in question on the basis of the tollgate data 1630 of the map information 16. Then, the navigation processing part 100 searches the tollgate lane display information 172 for a tollgate ID 1721 that coincides with the obtained tollgate ID 1631. The tollgate lane display information 172 is generated by the below-described ETC lane learning processing.

Then, the navigation processing part 100 judges whether a tollgate ID 1721 coincident with the tollgate ID 1631 (S140). When it is judged that a tollgate ID 1721 coincident with the tollgate ID 1631 exists (YES in S140), the flow proceeds to S150. On the other hand, when it is judged that a tollgate ID 1721 coincident with the tollgate ID 1631 does not exist (NO in S140), then the flow proceeds to S170.

When it is judged that a tollgate ID 1721 coincident with the tollgate ID 1631 exists (YES in S140), then the navigation processing part 100 obtains the ETC lane position 1723 of the tollgate ID 1721 in question from the tollgate lane display information 172 (S150).

When the ETC lane position 1723 is obtained (S150), the navigation processing part 100 displays an image showing the traveling direction in which the vehicle should ran, for guiding the user (S160). In detail, based on the position (right or left) indicated by the obtained ETC lane position 1723, the navigation processing part 100 instructs the display processing part 106 to display a screen as shown in FIG. 7(A). Further, using the voice input/output unit 22, the navigation processing part 100 outputs voice to inform the user that ETC lanes exist on the right or left side.

FIG. 7(A) is a view showing an example of a screen displayed on the display unit 20. As shown in the figure, the display processing part 106 displays a map screen 701 and a lane guide screen 711, for example by dividing the screen. Of course, it is possible to display the map screen 701 in the whole screen while the lane guide screen 711 is displayed as an interrupt window or a pop-up superimposed on the map screen 701. The map screen 701 displays a tollgate mark 703, a vehicle location mark 704 and the like by superimposing them on the map information. The road 702 shows a toll road.

In the lane guide screen 711, the display processing part 106 displays an image showing roughly the ETC lane position (showing the approximate direction to the ETC lanes). Here, the image is shown assuming the case where the ETC lane position 1723 is "right". Further, an ETC lane mark 713, a conventional lane mark 714, and the direction 715 are displayed being superimposed on a road image 712. Further, a tollgate name 716 and a remaining distance 717 to the tollgate are displayed. As the tollgate name 716, the tollgate name 1633 obtained from the tollgate data 1630 can be used, and as the remaining distance 717 a distance calculated using the present location information and the map information 16. In the case where the ETC lane position 1723 is "left", an image as shown in FIG. 7(B) is displayed as the lane guide screen.

As in standard map information shown in the map screen 701, rough display can be realized for example by generating an image as a combination of simplified (deformed) figures, not by displaying faithful reproduction of arrangement of actual roads and buildings.

It is sufficient for a user that he can recognize an approximate position of ETC lanes, and thus rough display is satisfactory. For example, in the case where a detailed path to a specific ETC lane is displayed, the user's consciousness of the limited direction in which the vehicle should be driven may rather cause embarrassment. Rough display allows a user to drive freely while recognizing an approximate ETC lane position.

Figure 8:
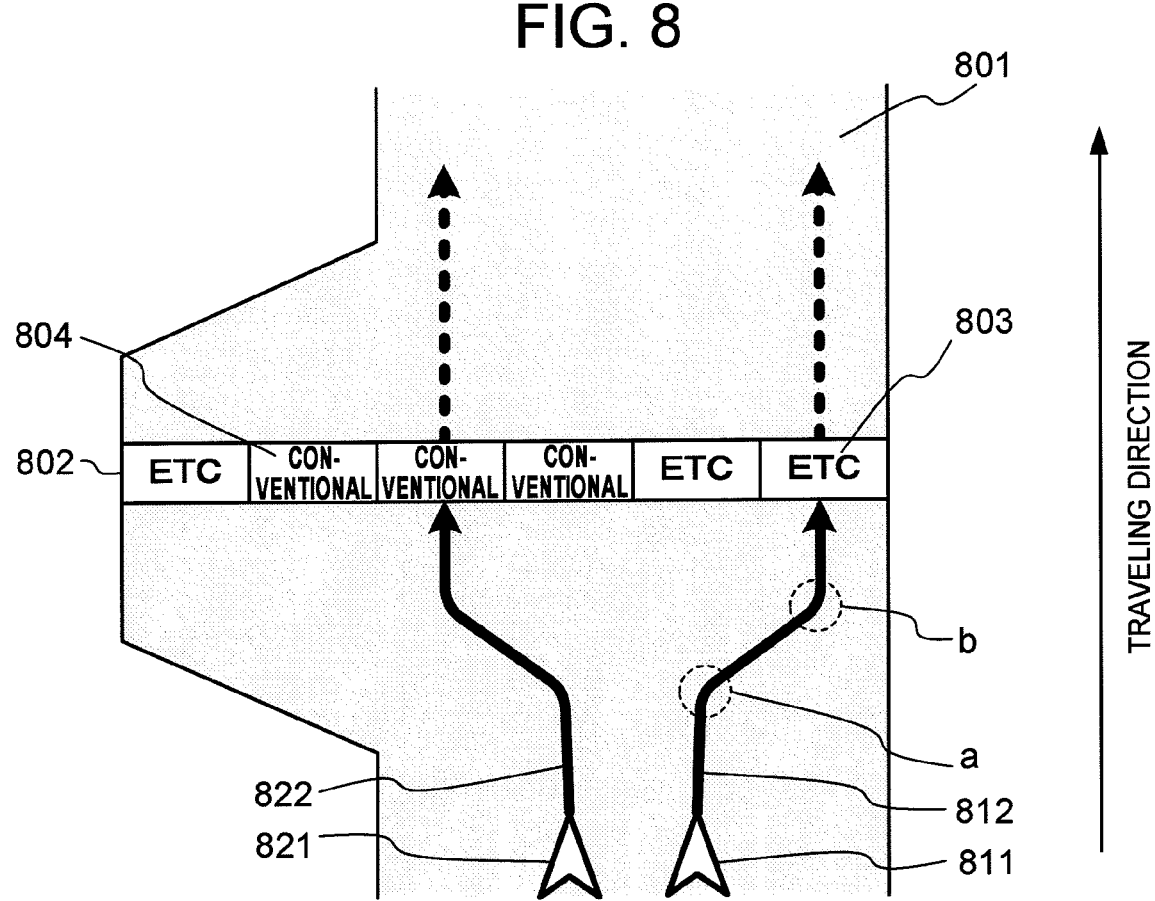
FIG. 8 is a schematic view showing an example of an actual tollgate.

For the above object, the lane guide screen 711 does not display the present location of the vehicle. Further, even if a plurality of lanes (for example, six lanes as shown in FIG. 8) exist at an actual tollgate, the lanes are displayed as two areas (the ETC lane mark 713 and the conventional lane mark 714) that can distinguish right and left. Further, lane lines and the like are not displayed clearly. Of course, the mode of displaying is not limited to the above-described one as far as it is rough displaying.

Returning to FIG. 5, description will be continued. On the other hand, when it is judged that a tollgate ID 1721 coincident with the tollgate ID 1631 does not exist (NO in S140), the navigation processing part 100 displays an image for notifying the user that the vehicle is approaching a tollgate (S170). In detail, the navigation processing part 100 instructs the display processing part 106 to display a screen as shown in FIG. 7(C) in the lane guide screen 711. Further, using the voice input/output unit 22, the navigation processing part 100 outputs voice to inform the user that the a tollgate is near. As shown in FIG. 7(C), the display processing part displays a tollgate name 718 superimposed on a road image 712 in the lane guide screen 711. Further, a remaining 717 distance to the tollgate is also displayed. Of course, such a screen may not be displayed.

After performing S160 or S170, the navigation processing part 100 erases the display of the lane guide screen 711 when passing of the tollgate is detected. Thereafter, the flow returns to S120.

As described above, the ETC lane guide processing (FIG. 5) is performed. The conventional lane guide processing (S200) can be realized by a flow of processing similar to S120-S170. That is to say, conventional lane positions are obtained previously instead of the ETC lane positions 1723 in the tollgate lane display information 172. Then, it is sufficient that a conventional lane position is obtained in S150 and the user is guided to the conventional lane position in S160.

Figure 6:
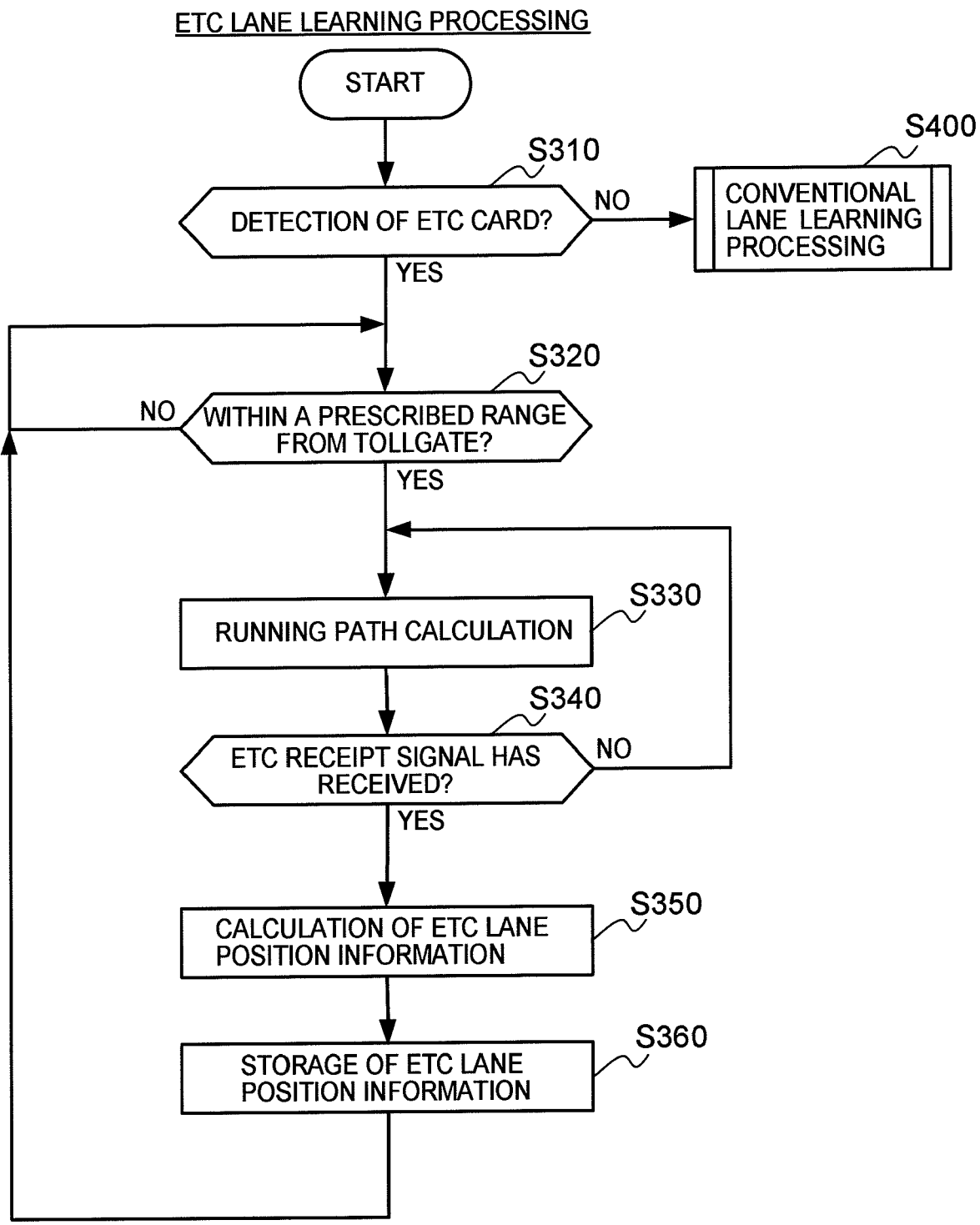
FIG. 6 is a flowchart showing a flow of processing of learning an approximate position of an ETC lane (ETC lane learning processing)
Figure 7:
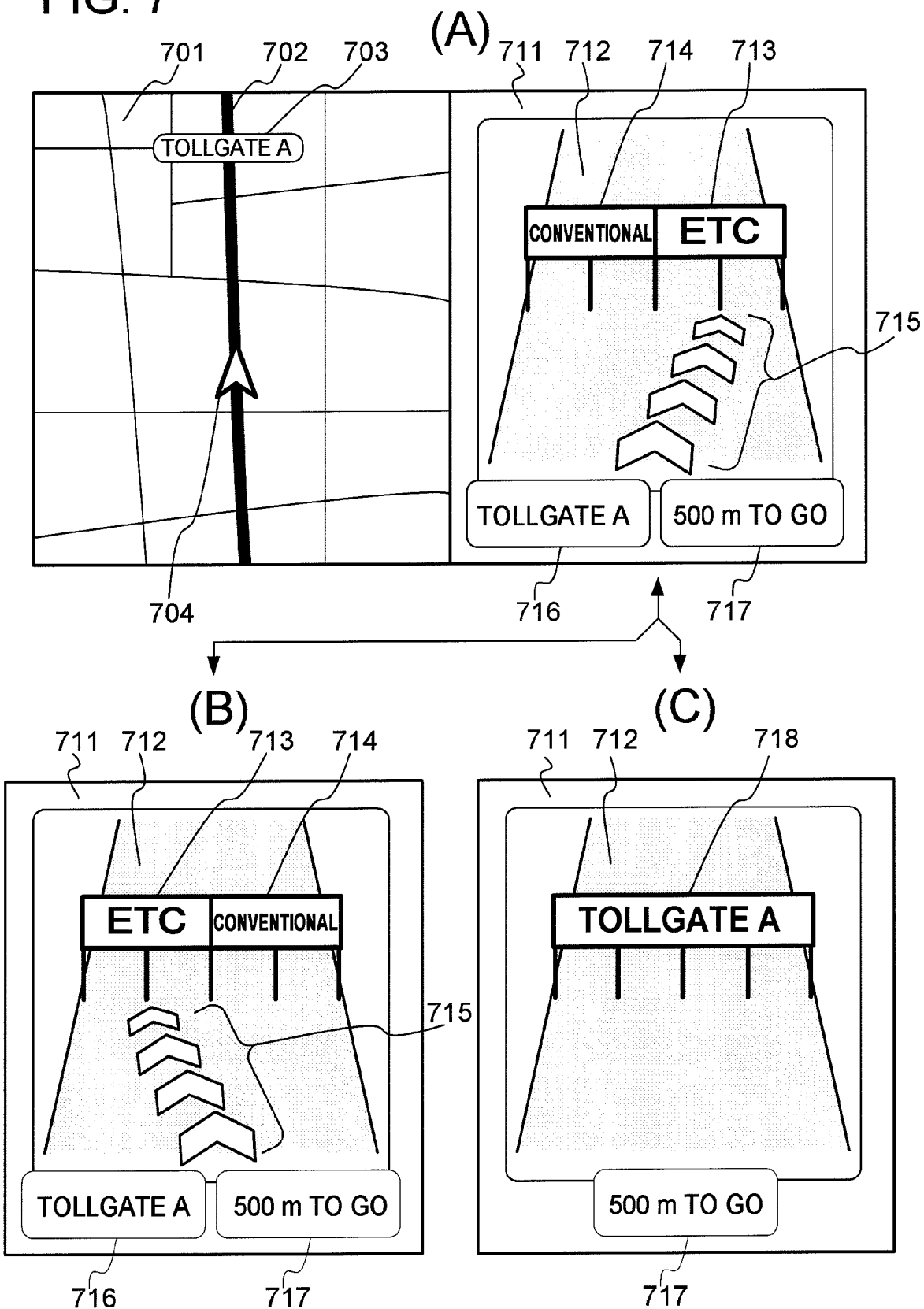
FIG. 7 is a view showing examples of a screen displayed on a display unit.

FIG. 6 is a flowchart showing a flow of processing of learning an approximate position of ETC lanes (the ETC lane learning processing). The ETC lane learning processing is performed in parallel with the above-described ETC lane guide processing.

The steps S310 and S320 are respectively similar to the steps S110 and S120 (FIG. 5), and their description will be omitted. When it is judged that an ETC card is not loaded (NO in S310), then the navigation processing part 100 starts conventional lane learning processing (S400).

When it is judged that a tollgate is within a prescribed distance (YES in S320), the navigation processing part 100 starts processing for obtaining and storing the ETC lane position (S330-S360).

First, the vehicle running path calculation part 112 starts calculation of a running path of the vehicle (S330) in response to an instruction from the navigation processing part 100. In detail, the vehicle running path calculation part 112 calculates a running path from the point (the present location) of the prescribed distance from the tollgate to a point (an ETC lane position) where the ETC receipt signal receiving part 114 receives an ETC receipt signal. The running path is calculated by using the map information 16 and the position information that is calculated at prescribed intervals (for example, at intervals of a prescribed distance or a prescribed period of time) by the present location calculation part 108 on the basis of information outputted from the GPS receiver 23 and the various sensors 24 (such as a speed sensor and a gyro sensor). Then, the vehicle running path calculation part 112 detects whether the vehicle has shifted to the lane on the right or left side or whether the traveling direction has been changed.

While the vehicle running path calculation part 112 calculates the vehicle running path (S330), the ETC receipt signal receiving part 114 judges whether an ETC receipt signal has been received from the in-vehicle ETC unit 2 (S340). When it is judged that an ETC receipt signal has not been received (NO in S340), the flow returns to S330. On the other hand, when it is judged that an ETC receipt signal has been received (YES in S340), the reception is notified to the navigation processing part 100, and the flow proceeds to S350.

Receiving the notification of the reception of the ETC receipt signal (YES in S340), the navigation processing part 100 calculates ETC lane position information by using the running path calculated by the vehicle running path calculation part 112 (S350). In detail, the navigation processing part 100 specifies the ETC lane position (right or left) on the basis of the running path. Further, the navigation processing part 100 obtains, as a passage date, time information calculated by using the information outputted from the GPS receiver 23.

Here, referring to FIG. 8, a method of specifying an ETC lane position on the basis of a running path will be described.

FIG. 8 is a schematic view showing an example of an actual tollgate. As shown in the figure, a tollgate 802 is placed on a road 801 and has six lanes. Seen from the right side of the traveling direction, the lanes are arranged in the order of two ETC lanes 803, three conventional lanes 804 and one ETC lane 803. Description will be given taking the running path 812 of the vehicle 811 as an example.

First, the navigation processing part 100 obtains information on a link (or links) passing the point of starting the running path calculation and the tollgate 802 from the map information 16. In the case, for example, where there is one such link, it is judged whether the running path has deviated from the link to the right or left side. By such operation, the navigation processing part 100 specifies an approximate ETC lane position. In the case of the figure, the ETC lane position is "right". In the case where two or more such links exist, an approximate ETC lane position is specified depending on whether the link of receiving an ETC receipt signal is on the right or left side.

Thus, the ETC lane position is specified. Of course, the method of specifying an ETC lane position is not limited to the above method. For example, it is possible to use information outputted by a sensor that detects a rotation direction and a rotation quantity of the steering wheel. For example, in the case of the running path 812 of the vehicle 811, an approximate ETC lane position can be specified by detecting vehicle's shift to the right lane on the basis of steering operations detected at the points a and b. In the case where the information on a link (links) is not used, an approximate ETC lane position can be specified by using the vehicle running path to analyze how the traveling direction of the vehicle has changed.

Returning to FIG. 6, description will be continued. When the ETC lane position is specified (S350), the navigation processing part 100 stores that position information as the tollgate lane information 17 (S360). In detail, the navigation processing part 100 adds the tollgate ID 1711 of the tollgate through which the vehicle has passed to the tollgate lane history information 171 (except when the tollgate ID 1711 in question has been already stored). Further, the navigation processing part 100 associates the obtained passage date 1712 with the ETC lane position 1713 and adds the associated information to the history of the tollgate ID 1711. Each time the vehicle passes through the same tollgate, a pair of a passage date 1712 and an ETC lane position 1713 is added to and accumulated in the history of that tollgate.

Further, the navigation processing part 100 generates the tollgate lane display information on the basis of the tollgate lane history information 171. In detail, first the navigation processing part 100 determines one ETC lane position by a prescribed method (for example, a method that selects a position included in the most pieces of information stored) on the basis of the ETC lane positions 1713 of the tollgate through which the vehicle has passed. Then, the navigation processing part 100 associates the tollgate ID 1721 with the determined ETC lane position 1723 and adds the associated information to the tollgate lane display information 172. In the case where the lane display information of the tollgate concerned has been already stored, it is sufficient to update only the ETC lane position 1723. After performing the above processing, the flow returns to S320.

As described above, the ETC lane learning processing (FIG. 6) is performed. The conventional lane learning processing (S400) can be performed by a flow of processing similar to S320-S360. Thus, different points only will be described in the following.

First, instead of the ETC lane positions 1713 of the tollgate lane history information 171 and the ETC lane positions 1723 of the tollgate lane display information 172, conventional lane positions are stored. In S340, using for example a speed sensor and a sensor for detecting opening and closing of a window, the navigation processing part 100 judges whether the vehicle is stopped at the tollgate and the window of the driver's seat is opened, i.e. whether the toll has been paid. In S350, the navigation processing part 100 calculates conventional lane position information by using the running path or the like. In S360, the navigation processing part 100 stores the calculated position information as the tollgate lane information 17.

Hereinabove, the first embodiment of the present invention has been described. According to this embodiment, the navigation device can guide a vehicle to a lane to run even if the navigation device uses map data that does not include lane information or sufficient lane information.

In other words, using a running path of the vehicle and an ETC receipt signal, the navigation device stores the ETC lane position of a tollgate through which the vehicle has passed. When the vehicle passes through the same tollgate again, the navigation device can guide the vehicle to the ETC lane position by using the stored ETC lane position.

Further, the history of ETC lane positions is accumulated with respect to a same tollgate. As a result, the accuracy of the ETC lane position used for the guidance can be improved.

Further, according to the above embodiment, the navigation device gives guidance to an approximate direction to an ETC lane position. Such guide display is user-friendly, and a user can easily understand in which direction he should bring the vehicle, right or left. Further, the user can freely drive the vehicle while recognizing an approximate ETC position.

The present invention has been described taking an exemplary embodiment. Many substitutes, modifications and variations are obvious to a person skilled in the art. Thus, the above-described embodiment of the present invention is intended to exemplify the gist and the range of the present invention, not to limit the invention.

For example, in the present invention, the calculated ETC lane position or conventional lane position may be stored not only in the navigation device 1 but also in the information center 3.

In detail, the tollgate lane information 17 is stored in a storage unit in the information center 3. Then, in the case where the lane information of a designated tollgate is not stored in the storage unit 15, the navigation processing part 100 searches the tollgate lane information 17 in the information center 3 through the telematics processing part 102. Further, the navigation processing part 100 stores the calculated ETC lane position or the calculated conventional lane position in the tollgate lane information 17 of the information center 3 through the telematics processing part 102.

According to the above variation, a plurality of vehicles can share information on ETC lane positions and/or conventional lane positions. In other words, even when a vehicle has not passed through a tollgate, the navigation device of the vehicle can guide the vehicle to an ETC lane position or a conventional lane position of the tollgate as far as other vehicles have passed through the tollgate. Further, when history of lane positions calculated by vehicles is accumulated with respect to a same tollgate, it is possible to give guidance more accurately to the ETC lane position or the conventional lane position.

Or, vehicles may share information on ETC lane positions and/or conventional lane positions by communicating with one another directly or through antennas or the like placed on roads, without using the information center 3.

Supplementary Description of First Embodiment

Figure 9:
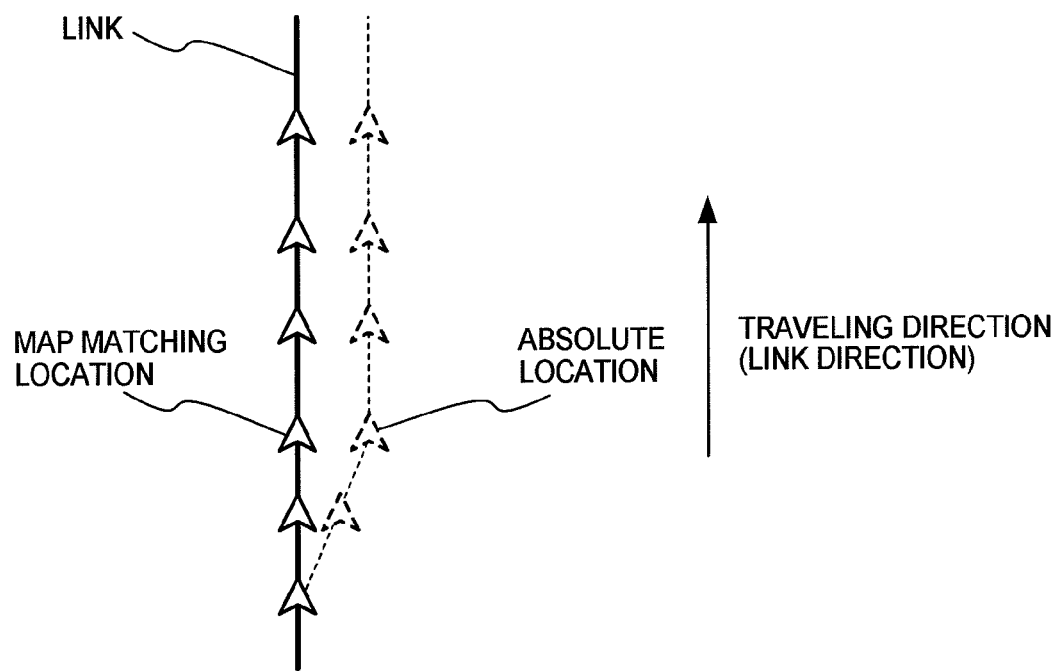
FIG. 9 is a diagram for explaining a relation between a link direction and an absolute location.

Referring to FIG. 9, supplementary description will be given with respect to the method of specifying the direction of shifting lanes on the basis of a running path. FIG. 9 is a diagram for explaining a relation between a link direction and an absolute location.

As shown in the figure, in the present embodiment, the navigation processing part 100 judges whether absolute location running path calculated by the vehicle running path calculation part 112 deviates from a link direction to the right or left. In the case where the absolute location running path deviates from the link direction to the right or left, it is judged that the vehicle has shifted to the lane on the right or left side. Here, the link direction means a direction specified from coordinate information of the two nodes (the start node and the end node) constituting a link.

In the navigation processing, to display the present location on a road in a map image, map matching processing is performed so that the present location is positioned on a link. However, since a location (a map matching location) calculated by the map matching processing is positioned on a link, it is not possible to use the map matching location for detecting vehicle's shift between lanes.

Thus, in the background of the map matching processing, the vehicle running path calculation part 112 performs processing of calculating a running path of the absolute location. Here, the absolute location means a location (a GPS location) calculated by using information outputted from the GPS receiver 23, a location calculated by using information outputted from the GPS receiver 23 and the various sensors 24, a location calculated by using the map matching location and information outputted from the various sensors 24, or the like. That is to say, the absolute location is a location other than the map matching location.

Using the running path of the absolute location calculated as described above, the navigation processing part 100 judges whether the running path of the absolute location deviates from the link direction to the right or left. In the example shown in the figure, the running path of the absolute location deviates from the link direction to the right, it is possible to judge that the vehicle has shifted to the lane on the right. Then, based on this shift direction, it is possible to specify an approximate ETC lane position (direction) or an approximate conventional lane position (direction).

Second Embodiment

Next, a second embodiment will be described referring to drawings.

The second embodiment is arranged such that a lane under traffic regulation is notified to a user. In the following, different points from the first embodiment will be described mainly.

Figure 10:
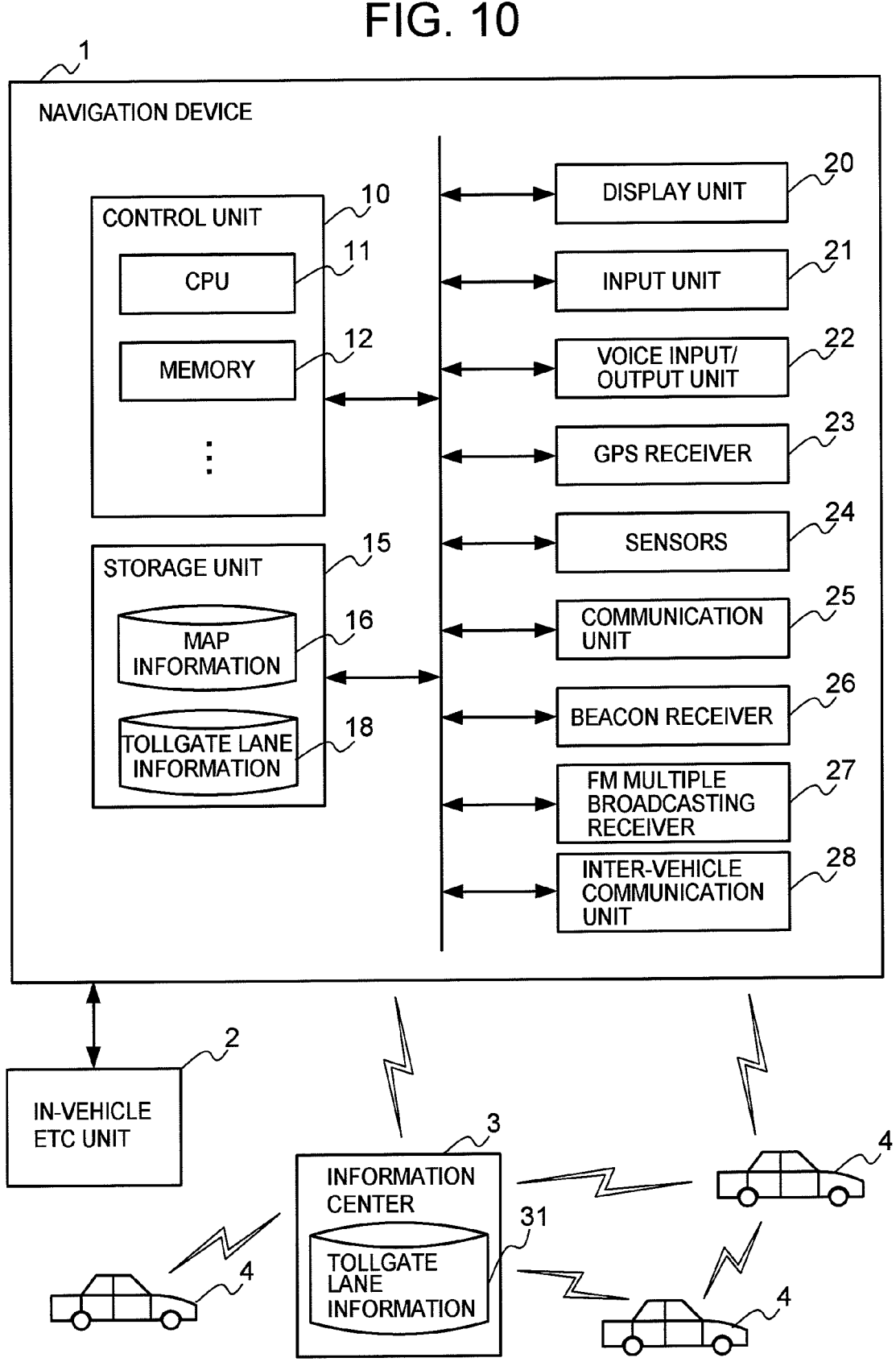
FIG. 10 is a block diagram showing an outline of a system configuration as well as a hardware configuration of a navigation device according to a second embodiment of the present invention.

FIG. 10 is a block diagram showing an outline of a system configuration as well as a hardware configuration of a navigation device according to the second embodiment of the present invention.

Differently from the first embodiment (See FIG. 1), the navigation device 1 comprises a beacon receiver 26, an FM multiple broadcasting receiver 27, an inter-vehicle communication unit 28. Further, the storage unit 15 stores the tollgate lane information 18. In the first embodiment also, the navigation device 1 may have a beacon receiver 26, an FM multiple broadcasting receiver 27 and an inter-vehicle communication unit 28.

The beacon receiver 26 receives a radio signal or an optical signal sent from a beacon placed on a road or the like. A signal sent from a beacon includes traffic information such as traffic jam information, traffic regulation information, service area/parking area (SA/PA) information, parking lot information, and the like, for example.

The FM multiple broadcasting receiver 27 receives an FM multiple broadcasting signal sent from an FM multiple broadcasting station. An FM multiple broadcasting signal includes traffic information such as traffic jam information, traffic regulation information, SA/PA information, parking lot information, weather information, character information provided by a radio station, and the like, for example.

The inter-vehicle communication unit 28 performs radio communication with other vehicles 4. The inter-vehicle communication unit 28 communicates with an inter-vehicle communication unit mounted on another vehicle 4 according to a communication system such as DSRC or wireless LAN, for example. The inter-vehicle communication unit 28 sends and receives traffic information such as traffic jam information, traffic regulation information and the like, for example.

The control unit 10 uses the communication unit 25, the beacon receiver 26 and the FM multiple broadcasting receiver 27 to receive traffic information, information on tollgate lanes and the like from the information center 3, and stores those pieces of information in the storage unit 15. Further, the control unit 10 uses the inter-vehicle communication unit 28 to receive traffic information, information on tollgate lanes and the like from other vehicles 4, and stores those pieces of information in the storage unit 15. Further, the control unit 10 various pieces of information such as traffic information, information on tollgate lanes and the like to the information center 3 and other vehicles 4.

Figure 11:
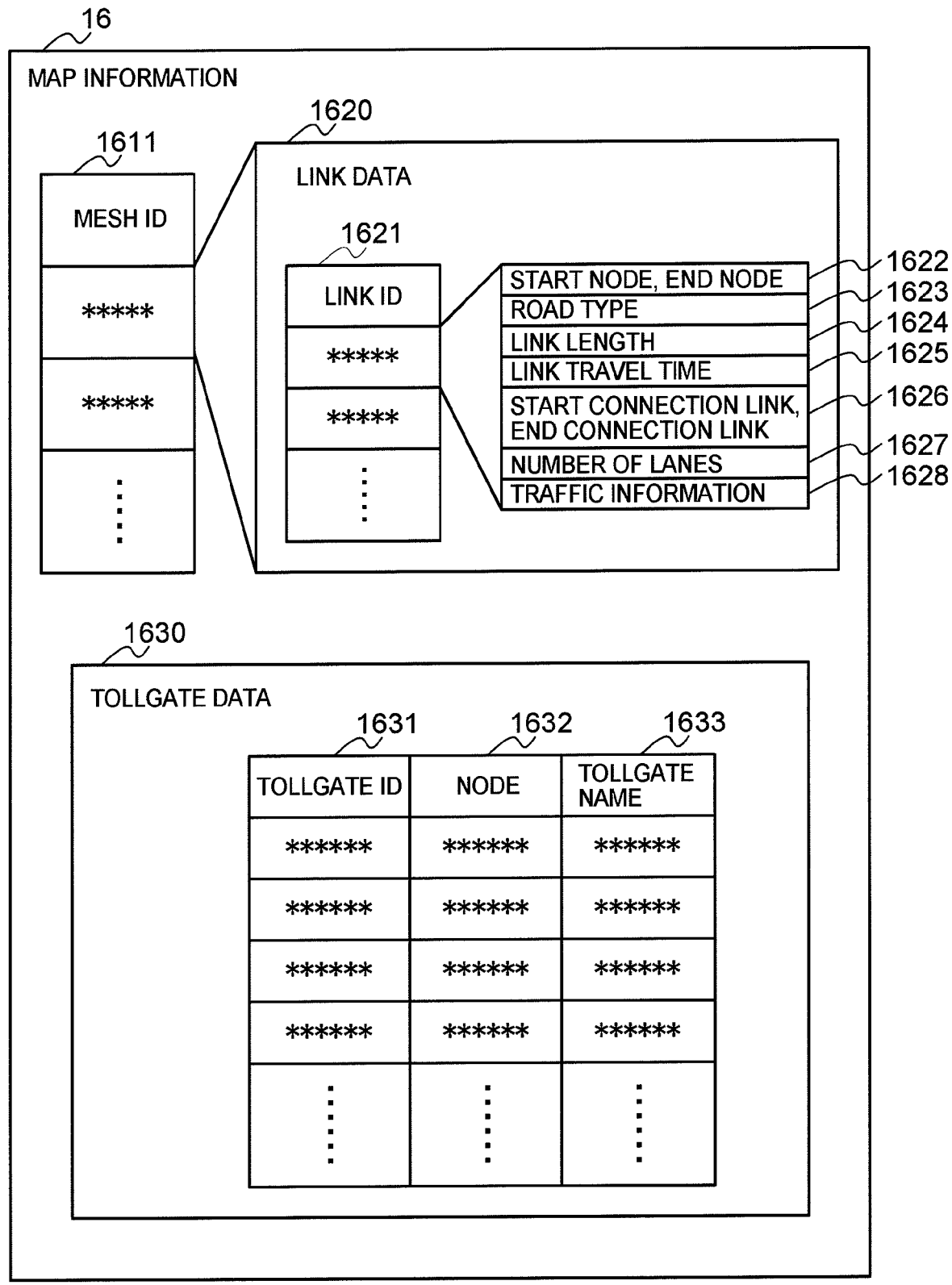
FIG. 11 is a diagram for explaining an example of data structure of map information.

Referring to FIG. 11, the map information 16 will be described. Differently from the first embodiment (See FIG. 2), the link data 1620 is constructed so that it can store traffic information 1628 for each link ID 1621. Also in the first embodiment, the map information 16 may store the traffic information 1628.

Figure 12:
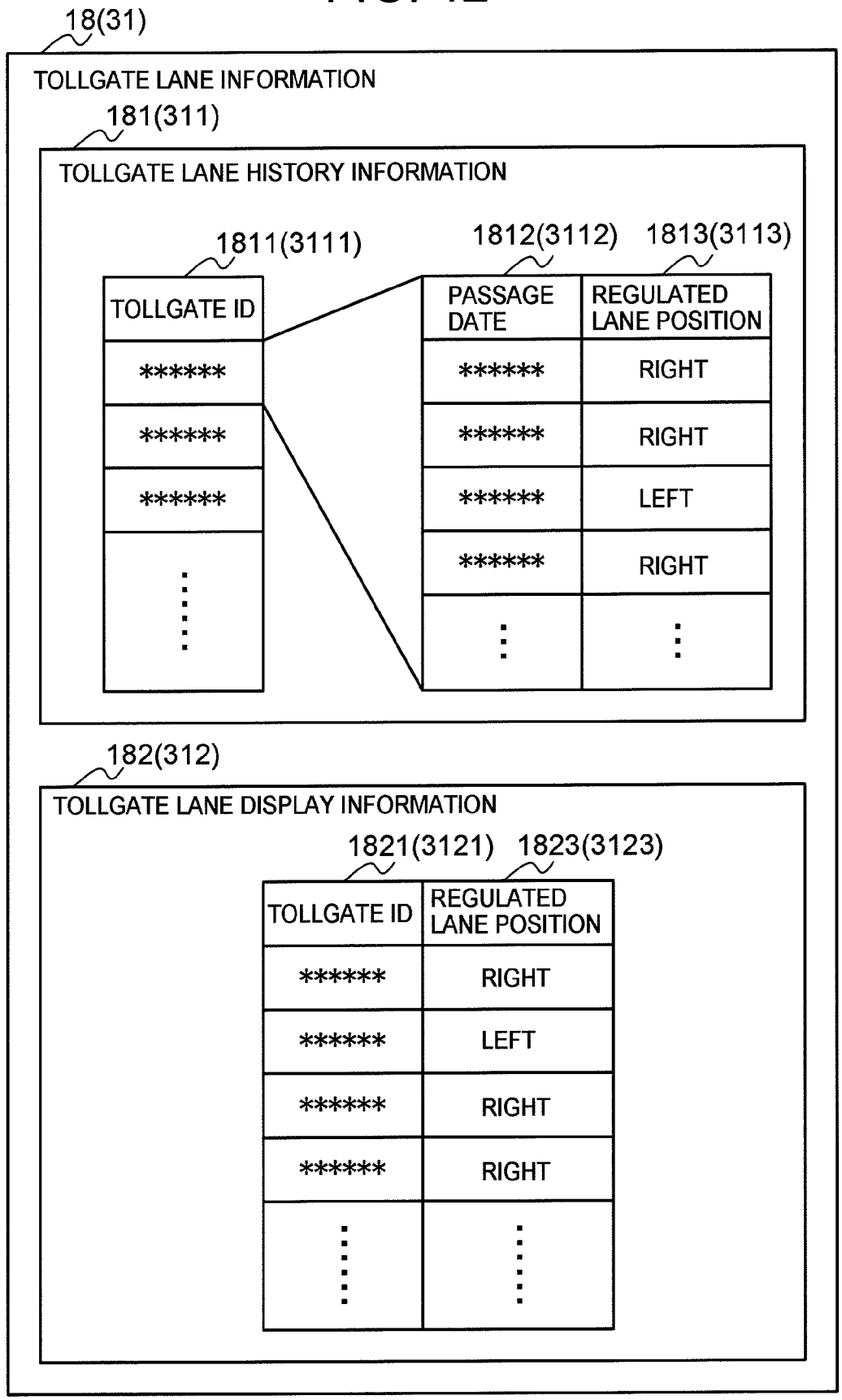
FIG. 12 is a diagram for explaining an example of data structure of tollgate lane information.

Referring to FIG. 12, the tollgate lane information 18 will be described. Differently from the tollgate lane information 17 of the first embodiment (See FIG. 3), the tollgate lane information 18 stores regulated lane positions 1813 and regulated lane positions 1823 instead of ETC lane positions 1713 and ETC lane positions 1723. A regulated lane position is information that indicates an approximate position of lanes whose vehicle traffic is regulated at a tollgate.

The tollgate ID 1811 and the passage date 1812 in the tollgate lane history information 181 are similar to the tollgate ID 1711 and the passage date 1712 in the tollgate lane history information 171. The tollgate ID 1821 in the tollgate lane display information 182 is similar to the tollgate ID 1721 in the tollgate lane display information 172.

The information center 3 has tollgate lane information 31. As shown in FIG. 12, the tollgate lane information 31 is similar, in structure, to the tollgate lane information 18. The tollgate ID 3111, the passage date 3112 and the regulated lane position 3113 in the tollgate lane history information 311 are similar to the tollgate ID 1811, the passage date 1812 and the regulated lane position 1813 in the tollgate lane history information 181. The tollgate ID 3121 and the regulated lane position 3123 in the tollgate lane display information 312 are similar to the tollgate ID 1821 and the regulated lane position 1823 in the tollgate lane display information 182.

The information center 3 communicates with a plurality of vehicles by radio to collect tollgate lane history information 311, and stores the collected tollgate lane history information 311 in its storage unit. Then, the information center 3 analyzes the tollgate lane history information 311 statistically, to generate tollgate lane display information 312. Further, the information center 3 delivers the generated tollgate lane display information 312 to vehicles through beacons, FM multiple broadcasting, wireless telephone communication lines, and the like. The information center 3 is implemented by an ordinary server computer or the like, and can perform information processing described above. It is possible that a plurality of information centers 3 exist.

Figure 13:
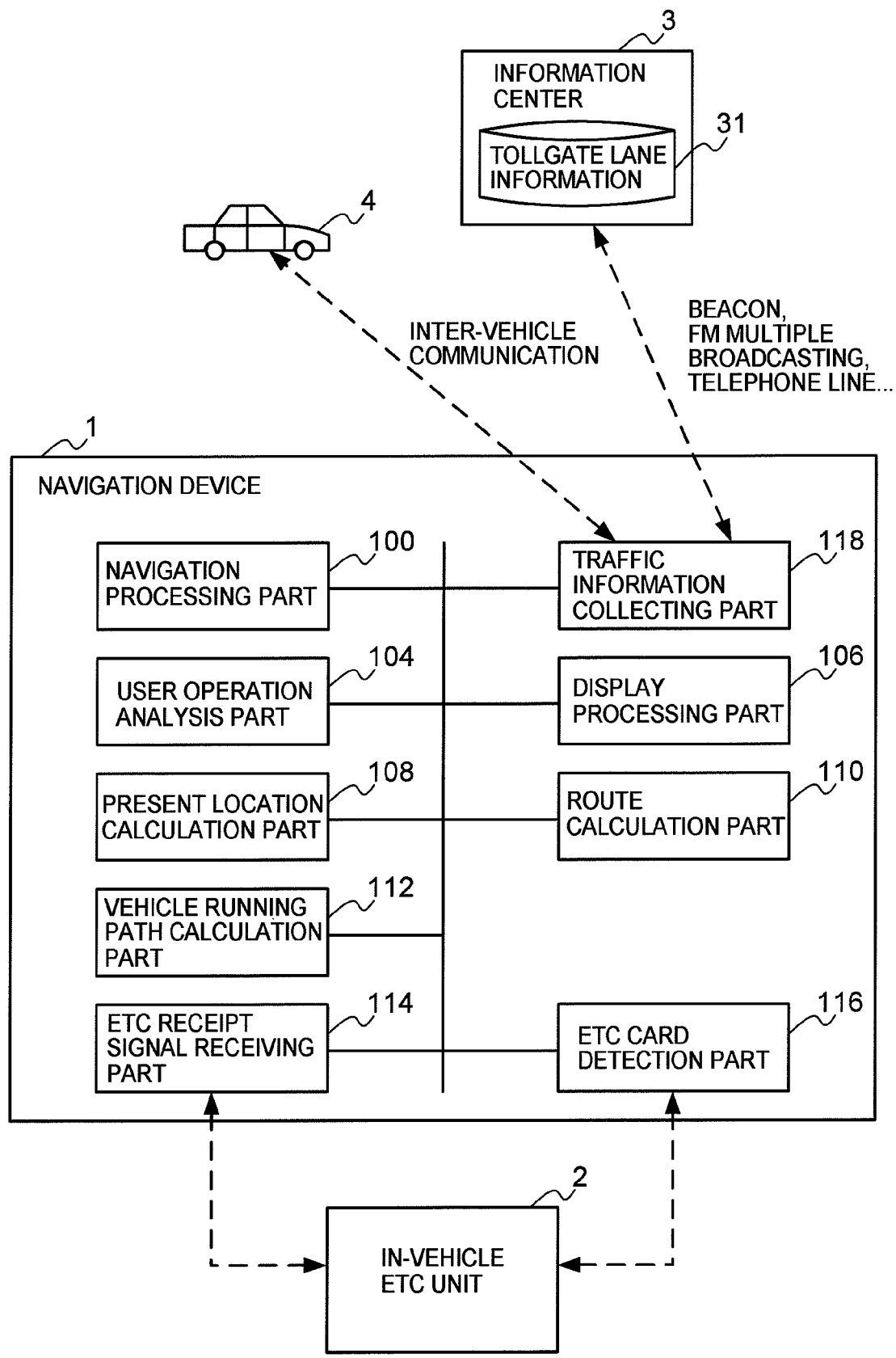
FIG. 13 is a block diagram showing a configuration of functions that a navigation device has.

FIG. 13 is a block diagram showing a configuration of functions that the navigation device 1 has.

Differently from the first embodiment (FIG. 4), the navigation device 1 comprises a traffic information collecting part 118. Also in the first embodiment, the navigation device 1 may have a traffic information collecting part 118.

The traffic information collecting part 118 receives the traffic information and the tollgate lane display information delivered by the information center 3 through the communication unit 25, the beacon receiver 26, and the FM multiple broadcasting receiver 27. Further, the traffic information collecting part 118 receives the traffic information and the tollgate lane display information sent from another vehicle 4 through the inter-vehicle communication unit 28. Further, the traffic information collecting part 118 stores the received traffic information and tollgate lane display information in the storage unit 15 so that those pieces of information can be taken out and used at any time upon request. Those pieces of information may be stored in the memory 12 such as a RAM.

In detail, the traffic information collecting part 118 stores, in the map information 16, traffic information including link data, as the traffic information 1628 of a corresponding link ID 1621. The traffic information including link data is, for example, traffic jam information, traffic regulation information, and the like. The traffic jam information includes information indicating link data, the start position and end position of traffic jam, degree of congestion of the traffic jam, cause of the traffic jam, and the like, for example. The traffic regulation information includes link data, section under traffic regulation, cause of the traffic regulation, and the like, for example.

Further, the traffic information collecting part 118 stores the received tollgate lane display information as the tollgate lane display information 182 in the storage unit 15.

Further, the traffic information collecting part 118 sends the traffic information and the tollgate lane history information 181 stored in the storage unit 15 to the information center 3 through the communication unit 25. Further, the traffic information collecting part 118 sends the traffic information and the tollgate lane display information 182 to other vehicles 4 through the inter-vehicle communication unit 28.

The traffic information and the tollgate lane display information may be delivered by the information center 3 at prescribed time intervals, or may be obtained from the traffic information collecting part 118 under prescribed conditions.

Next, referring to FIGS. 14-17, regulated lane guide processing and regulated lane learning processing at a tollgate will be described.

Figure 14:
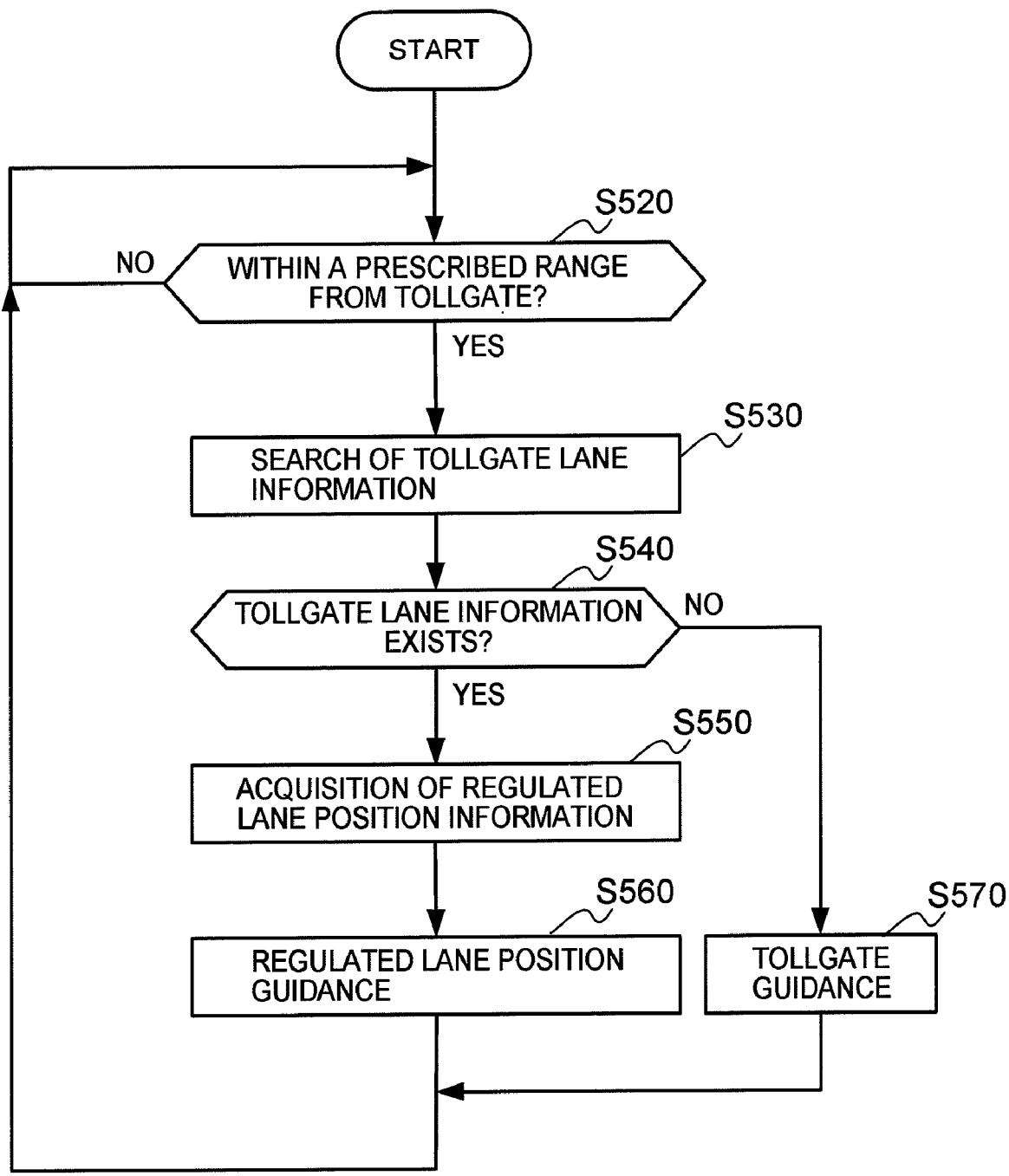
FIG. 14 is a flowchart showing a flow of processing of notifying a user of regulated lanes at a tollgate (regulated lane guide processing)

FIG. 14 is a flowchart showing a flow of processing of notifying a user of regulated lanes (the regulated lane guide processing).

Steps S520-S570 are realized by basically similar processing to the processing in the S120-S170 of the ETC lane guide processing (See FIG. 5), and their description will be omitted.

Here, in S560, the navigation processing part 100 performs the following processing.

In detail, based on the position (right or left) indicated by the obtained regulated lane position 1823 (S550), the navigation processing part 100 instructs the display processing part 106 to display a screen as shown in FIG. 16(A) for example. Further, the navigation processing part 100 outputs voice for informing a user that the regulated lanes exist on the right or left side, by using the voice input/output unit 22. Of course, voice for informing non-regulated lanes may be outputted.

As shown in FIG. 16(A), in the map screen 701, the display processing part 106 displays a regulation mark 705 by superimposing it on a road 702 corresponding to the link under traffic regulation, in the map screen 701. Further, in the lane guide screen 711, the display processing part 106 displays an image that indicates an approximate position of the regulated lanes.

Here, the image is shown assuming the case where the regulated lane position 1823 is "left". Further, an ETC-cum-conventional lane mark 720, a regulated lane mark 721 and a direction 715 are displayed being superimposed on a road image 712. The direction 715 is an image that shows the direction to the ETC-cum-conventional lane mark 720 on the opposite side to the regulated lane mark 721, for informing the user of the direction in which the vehicle can run.

In the case where the regulated lane position 1823 is "right", the display processing part 106 displays an image as shown in FIG. 16(B) in the lane guide screen 711.

Figure 15:
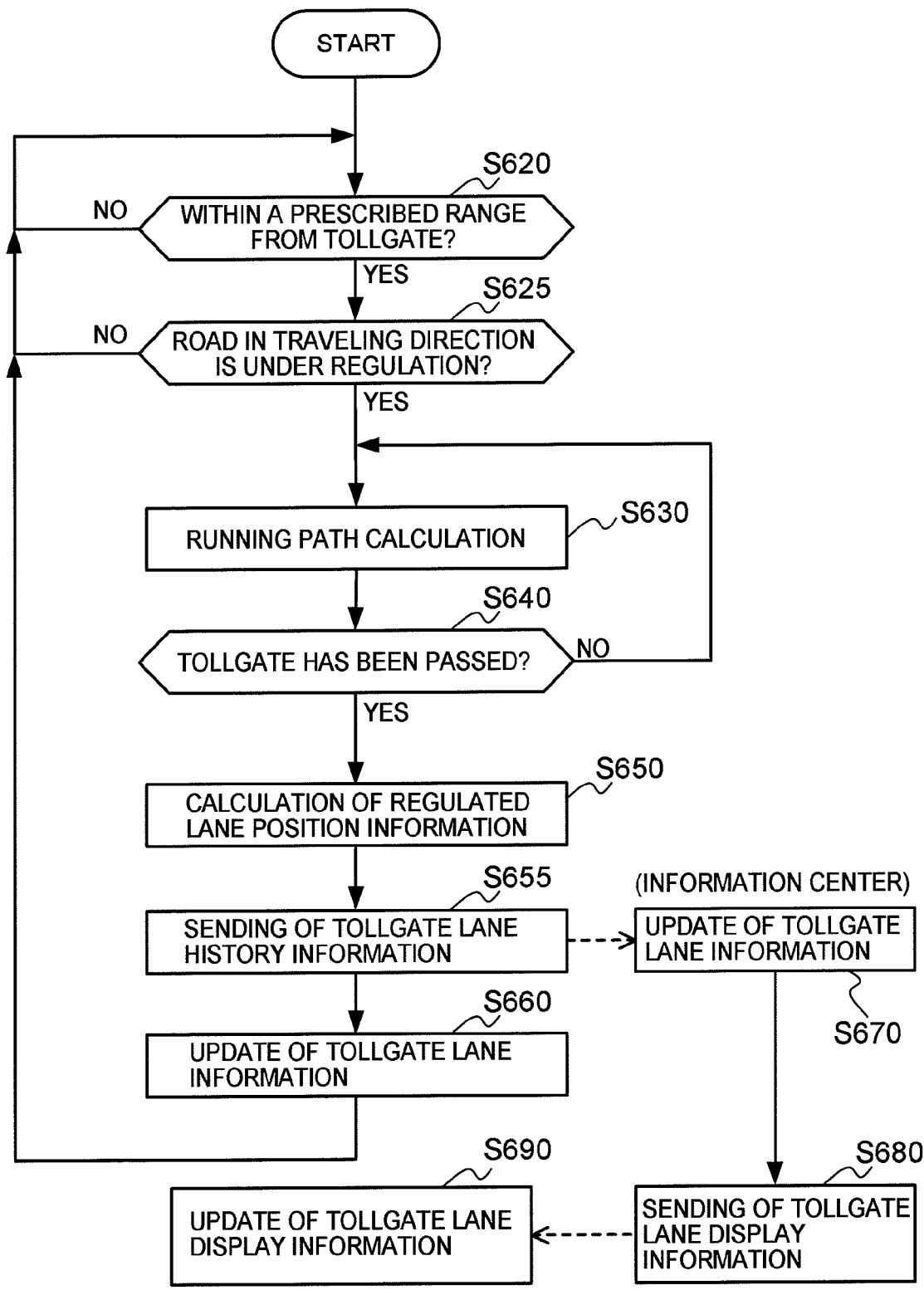
FIG. 15 is a flowchart showing a flow of processing of learning an approximate position of regulated lanes at a tollgate (regulated lane learning processing)
Figure 16:
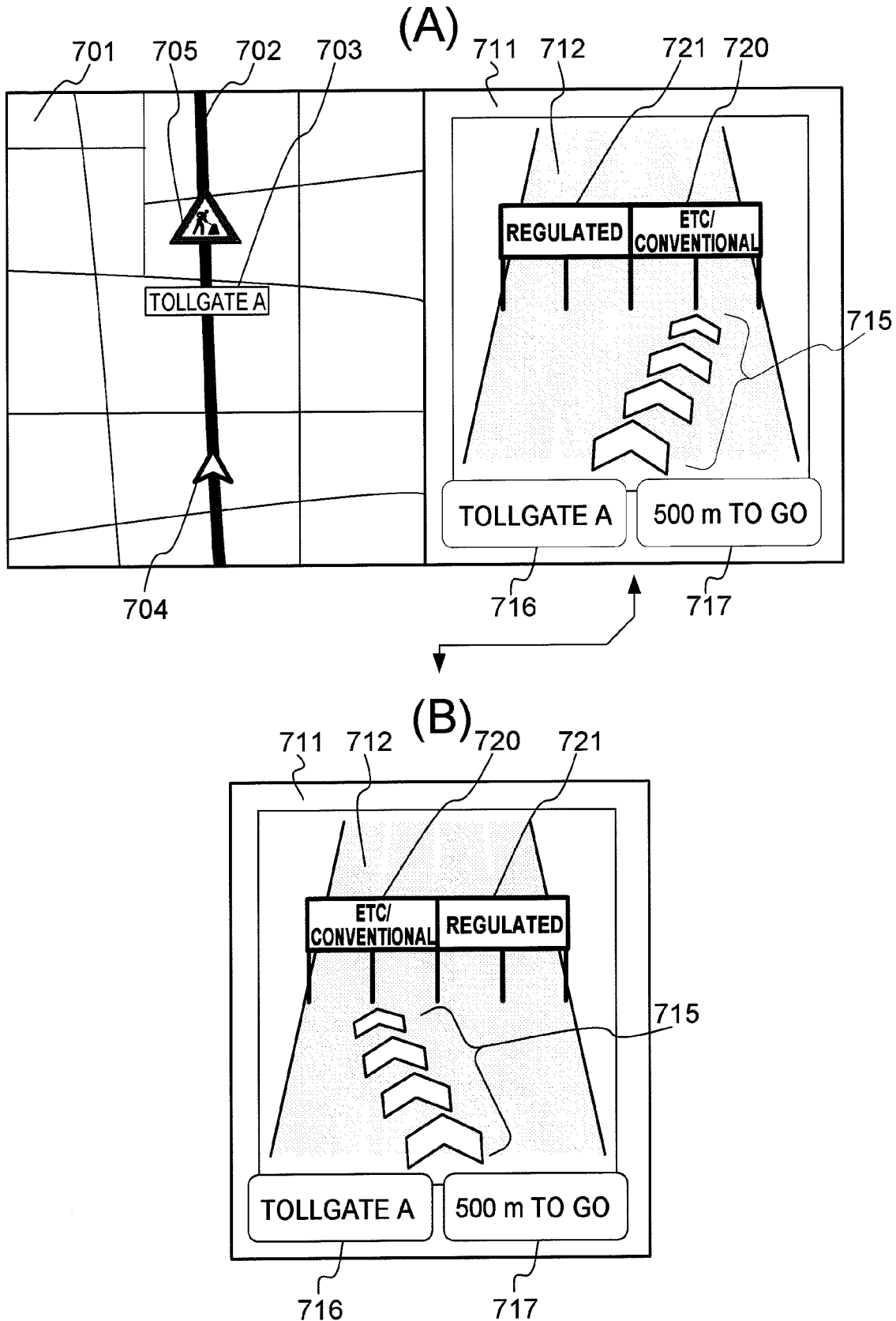
FIG. 16 is a view showing examples of a screen displayed on a display unit.

FIG. 15 is a flowchart showing a flow of processing of learning an approximate position of regulated lanes at a tollgate (the regulated lane learning processing).

S620 is similar to S320 of the ETC lane learning processing (See FIG. 6), and its description will be omitted.

When it is judged that a tollgate is within a prescribed distance (YES in S620), the navigation processing part 100 judges whether the road in the traveling direction is regulated or not (S625). In detail, first, using the present location information calculated by the present location calculation part 108 and the map information 16, the navigation processing part 100 specifies a link that is connected to the approaching tollgate node (S620) on the vehicle's traveling side of that node.

Then, the navigation processing part judges whether traffic regulation information is stored in the traffic information 1628 associated with the link ID 1621 of the specified link. When traffic regulation information is stored, it is judged that the road in the traveling direction is regulated (YES in S625), and the flow proceeds to S630. On the other hand, when traffic regulation information is not stored, it is judged that the road in the traveling direction is not regulated (NO in S625), the flow returns to S620.

Instead of the above judgment, the navigation processing part 100 may judge whether traffic regulation information is associated with a link on the near side of the approaching tollgate node.

S630 is similar to S330 of the ETC lane learning processing (See FIG. 6), and its description will be omitted. In the case where an ETC card is loaded, the vehicle running path calculation part 112 calculates a running path from the point (the present location) of a prescribed distance from the tollgate to a point where an ETC receipt signal is received. On the other hand, in the case where an ETC card is not loaded, the vehicle running path calculation part 112 calculates the point (the present location) of the prescribed distance from the tollgate to a point where the vehicle is stopped and the window of the driver's seat is opened, for example.

While the vehicle running path calculation part 112 calculates the running path (S630), the navigation processing part 100 judges whether the vehicle has passed through the tollgate (S640). In detail, the navigation processing part 100 judges whether the ETC receipt signal receiving part 114 has notified it of receiving of an ETC receipt signal, or whether the vehicle has been stopped and the window of the driver's seat has been opened.

In the case where receiving of an ETC receipt signal has been notified or the vehicle has been stopped and the window of the driver's seat has been opened, the navigation processing part 100 judges that the vehicle has passed through the tollgate (YES in S640), and the flow proceeds to S650. In the other case, it is judged that the vehicle has not passed through the tollgate (NO in S640), and the flow returns to S630.

When it is judged that the vehicle has passed through the tollgate (YES in S640), the navigation processing part 100 calculates regulated lane position information by using the running path calculated by the vehicle running path calculation part 112 (S650). In detail, the navigation processing part 100 specifies an ETC (or conventional) lane position (right or left) on the basis of the running path. Then, the position opposite to the ETC (or conventional) lane position is specified as a regulated lane position. Further, time information calculated by using the information outputted from the GPS receiver 23 is obtained as a passage date.

Figure 17:
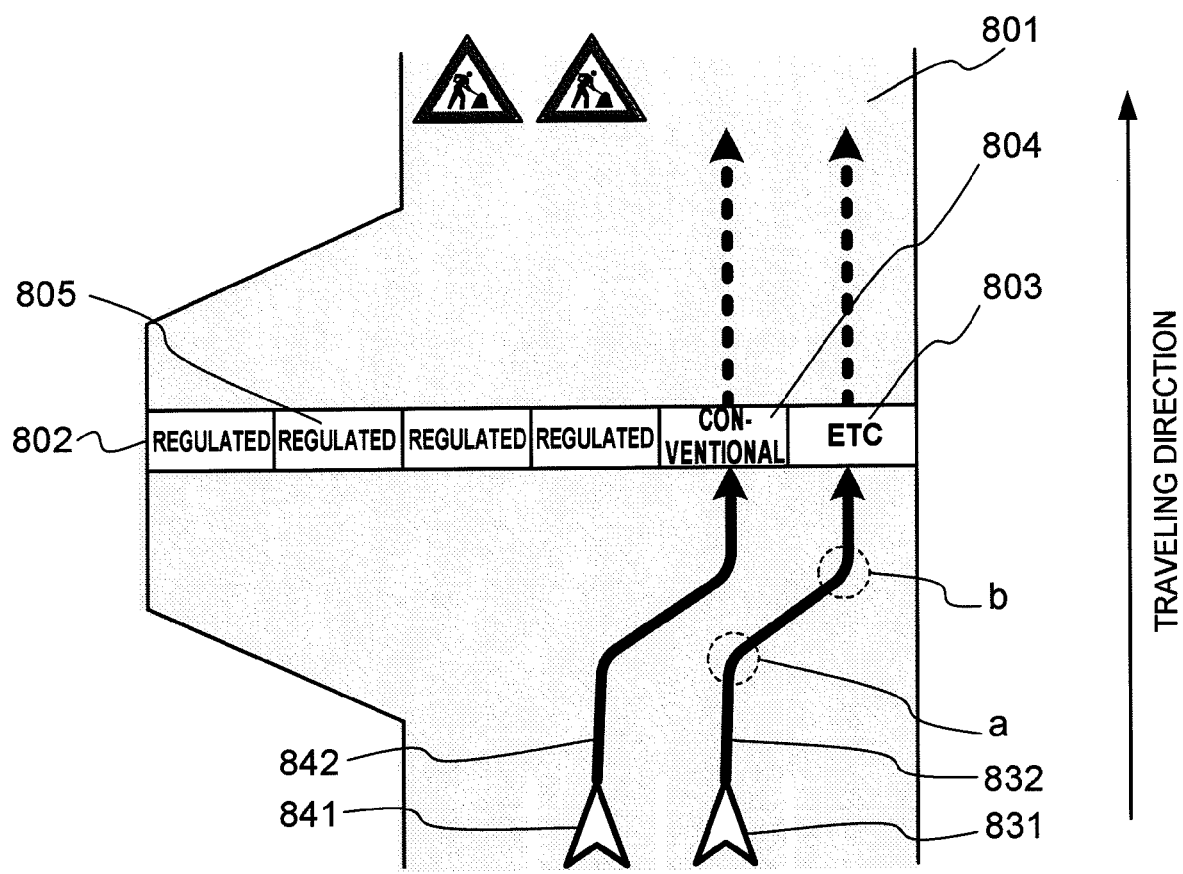
FIG. 17 is a schematic view showing an example of an actual tollgate.

Description will be given taking an example where an actual tollgate is arranged as shown in FIG. 17. As shown in the figure, a tollgate 802 is placed on a road 801 and has six lanes. Seen from the right side of the traveling direction, the lanes are arranged in the order of one ETC lane 803, one conventional lane 804, and four regulated lanes 805. Here, there is traffic regulation on two lanes on the left side of the road 801 owing to some cause (for example, an accident or construction works). Thus, the four regulated lanes 805 exist on the left side of the tollgate 802.

In the above case, there is traffic regulation on the road 801 on the traveling direction (the link direction) side of the tollgate 802. Further, the running path 832 of a vehicle 831 and the running path 842 of a vehicle 841 are shifted to the right from the traveling direction (the link direction). Thus, it is judged that the regulated lane position is "left".

Returning to FIG. 15, description will be continued. When the regulated lane position is specified (S650), the navigation processing part 100 sends the tollgate lane history information to the information center 3 (S655). In detail, the navigation processing part 100 generates the tollgate lane history information that associates the tollgate ID of the passed tollgate with the obtained passage date and the regulated lane position, and sends the generated tollgate lane history information to the information center 3 through the traffic information collecting part 118. Then, the flow proceeds to S660.

After the sending of the tollgate lane history information (S655), the navigation processing part 100 updates the tollgate lane information 18(S660). In detail, the navigation processing part 100 stores the generated tollgate lane history information, as the tollgate lane history information 181. Then, the navigation processing part 100 generates the tollgate lane display information 182 based on the tollgate lane history information 181. The method of storing the tollgate lane history information 181 and the method of generating the tollgate lane display information 182 are similar to those in the first embodiment (S360 of FIG. 6). After performing the above-described processing, the flow returns to S620.

On the other hand, when the information center 3 receives the tollgate lane history information, the information center 3 updates the tollgate lane information 31 (S670). In detail, first the information center 3 stores the received tollgate lane history information, as the tollgate lane history information 311. Then, the information center 3 generates the tollgate lane display information 312 based on the tollgate lane history information 311. The method of storing the tollgate lane history information 311 and the method of generating the tollgate lane display information are similar to those in the first embodiment (S360 of FIG. 6).

After the update of the tollgate lane information 31 (S670), the information center 3 sends (delivers) the tollgate lane display information 312 (S680). The information center 3 sends (delivers) the tollgate lane display information 312 through beacons, FM multiple broadcasting, ETC wireless telephone communication lines, and the like, for example. Here, as for the timing of the delivery, the delivery may be performed at prescribed time intervals or when a request is received from the navigation device 1, for example.

Receiving the tollgate lane display information 312, the traffic information collecting part 118 updates the tollgate lane display information 182 (S690). In detail, the traffic information collecting part 118 adds the received tollgate lane display information 312 to the tollgate lane display information 182. In the case where the tollgate lane display information 182 corresponding to the received tollgate lane display information 312 has been already stored, only the regulate lane position is updated.

As described above, the regulated lane learning processing (FIG. 15) at a tollgate is performed.

It is possible that the tollgate lane display information is sent not only from the information center 3 but also from other vehicles 4. In that case, for example when the present location comes within a prescribed distance from a tollgate, the traffic information collecting part 118 obtains the tollgate lane display information from other vehicles running in the neighborhood of its own vehicle through the inter-vehicle communication unit 28. Further, the ETC system may send the tollgate lane display information.

Hereinabove, the second embodiment of the present invention has been described. According to the second embodiment, information on regulated lanes at a tollgate is automatically generated even if the information has not been previously prepared by human works. Thus, the navigation device can guide the vehicle to a lane to run to avoid the regulated lanes, even if the navigation device uses map data that does not include information on the regulated lanes at a tollgate or sufficient information on the regulated lanes.

Further, the information center accumulates history of regulated lane position information calculated by a plurality of vehicles with respect to a same tollgate, and analyzes the accumulated information statistically. As a result, it is possible to improve the accuracy of the regulated lane position used for guidance.

Further, since the regulated lane information is delivered from the information center, it is possible to inform the regulated lane position even if a user's vehicle passes the tollgate for the first time.

Third Embodiment

Next, a third embodiment of the present invention will be described referring to drawings.

The third embodiment is arranged such that lanes under traffic regulation are notified to a user. In the present embodiment, regulated lanes are notified without depending on existence of a tollgate. In the following, different points from the second embodiment will be described mainly.

Figure 18:
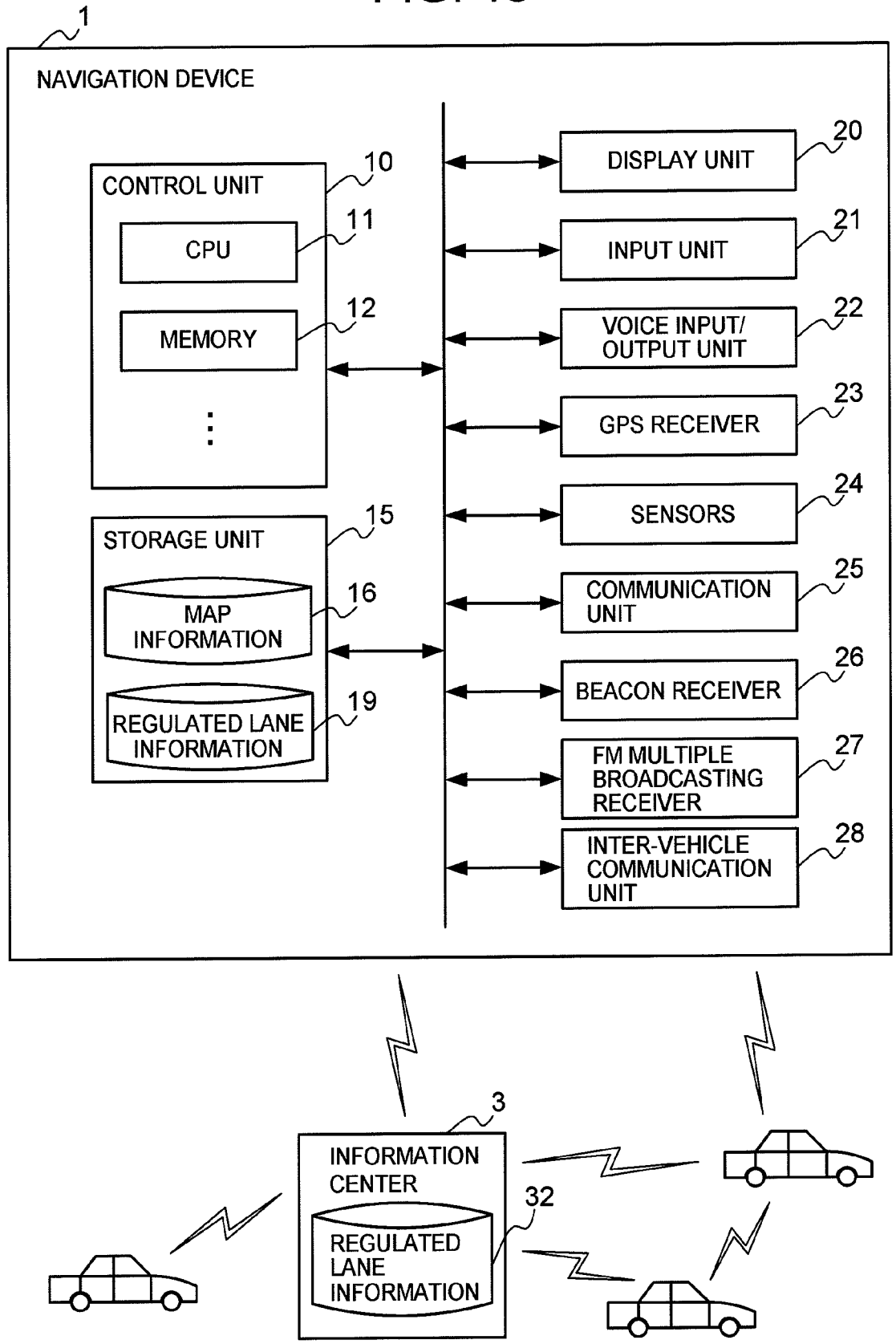
FIG. 18 is a block diagram showing an outline of a system configuration as well as a hardware configuration of a navigation device according to a third embodiment of the present invention.

FIG. 18 is a block diagram showing an outline of a system configuration as well as a hardware configuration of a navigation device according to the third embodiment of the present invention.

Differently from the second embodiment (See FIG. 10), the navigation device 1 stores regulated lane information 19 in the storage unit 15.

The control unit 10 receives traffic information, regulated lane display information and the like from the information center 3 through the communication unit 25, the beacon receiver 26 and the FM multiple broadcasting receiver 27, and stores the received information in the storage unit 15. Further, the control unit 10 receives traffic information, regulated lane display information and the like from other vehicles 4 through the inter-vehicle communication unit 28, and stores the received information in the storage unit 15. Further, the control unit 10 sends various kinds of information such as traffic information and regulated lane information to the information center 3 and other vehicle 4.

Figure 19:
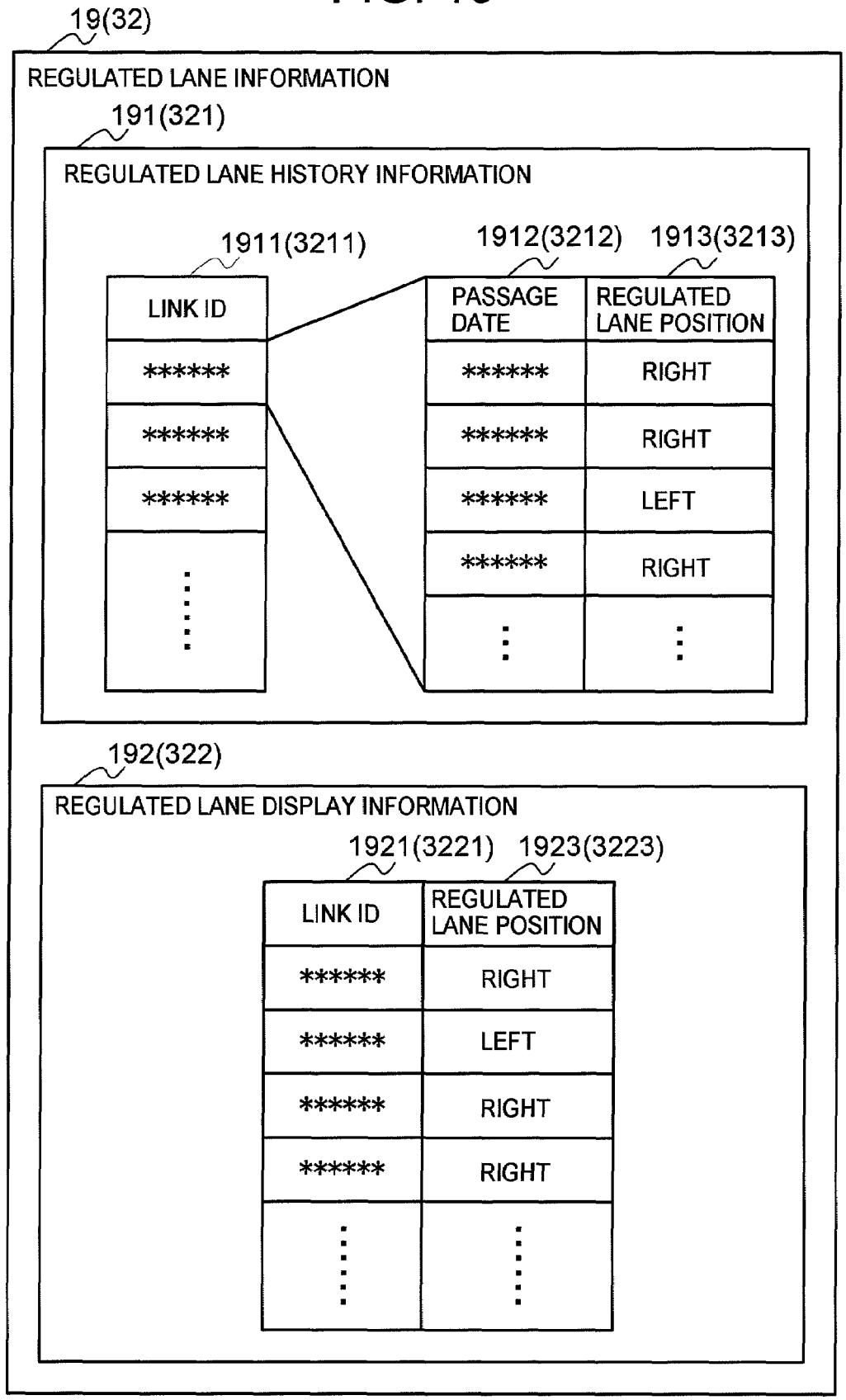
FIG. 19 is a diagram for explaining an example of data structure of regulated lane information.

As shown in FIG. 19, the regulated lane information 19 comprises regulated lane history information 191 and regulated lane display information 192.

The regulated lane history information 191 stores an approximate position of regulated lanes for each link. In detail, the regulated lane history information 191 stores one or more pieces of information associated with each link ID 1911, each piece of information comprising a passage date 1912 and a regulated lane position 1913. Here, the link ID 1911 corresponds to the link ID 1621 of the map information 16.

The regulated lane display information 192 stores a position determined by a prescribed method (for example, a method that selects a position included in the most pieces of information stored) on the basis of the regulated lane positions 1913 of the regulated lane history information 191, as a regulated lane position used in the navigation processing. In detail, for each link, a link ID 1921 and a regulated lane position 1923 are stored. The regulated lane display information 192 is used for guiding a user by displaying an approximate position of regulated lanes.

The information center has regulated lane information 32. As shown in FIG. 19, the structure of the regulated lane information 32 is similar to the regulated lane information 19. The link ID 3211, the passage date 3212 and the regulated lane position 3213 in the regulated lane history information 321 are similar to the link ID 1911, the passage date 1912 and the regulated lane position 1913 in the regulated lane history information 191. The link ID 3221 and the regulated lane position 3223 in the regulated lane display information 322 are similar to the link ID 1921 and the regulated lane position 1923 in the regulated lane display information 192.

The information center 3 communicates with a plurality of vehicles to collect regulated lane history information 321, and stores the collected information in its storage unit. Then, the information center 3 analyzes the regulated lane history information 321 statistically and generates regulated lane display information 322. Further the information center 3 delivers the generated regulated lane display information 322 to vehicles through beacons, FM multiple broadcasting, wireless telephone communication lines, and the like.

Next, referring to FIGS. 20-23, regulated lane guide processing and regulated lane learning processing will be described.

Figure 20:
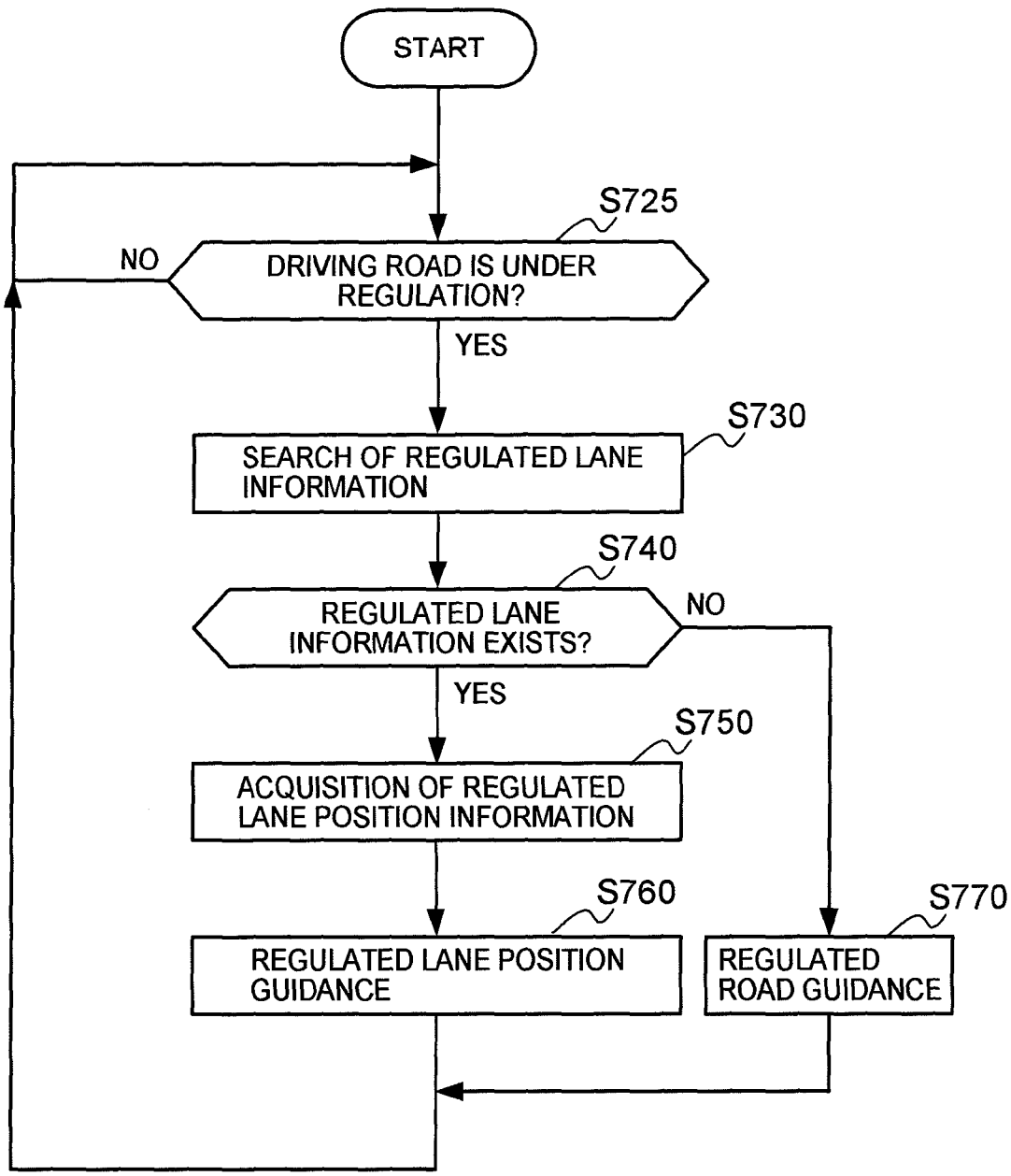
FIG. 20 is a flowchart showing a flow of processing of notifying a user of regulated lanes (regulated lane guide processing)

FIG. 20 is a flowchart showing a flow of processing of notifying a user of regulated lanes (the regulated lane guide processing).

While the vehicle is running, the navigation processing part 100 monitors whether the road that the vehicle is running is under regulation or not (S725). In detail, the navigation processing part 100 obtains the present location information calculated by the present location calculation part 108 and the map information 16 on the neighborhood of the present location periodically (for example, at intervals of a prescribed period of time or a prescribed distance, or the like). And, the navigation processing part 100 detects change of the link that the vehicle is running to another link.

Further, the navigation processing part 100 judges whether traffic regulation information is stored in the traffic information 1628 associated with the link ID 1621 of the link that the vehicle is running. When traffic regulation information is stored, it is judged that the road that the vehicle is running is under regulation (YES in S725), and the flow proceeds to S730. On the other hand, when traffic regulation information is not stored, it is judged that the road in question is not under regulation (NO in S725), and the navigation processing part 100 continues monitoring.

Of course, it may not be judged whether traffic regulation information is associated with the link that the vehicle is running. In that case, it is judged simply whether the link that the vehicle is running has changed. When it is judged that the link has changed, the flow proceeds to S730. Or, it may be judged whether not the link that the vehicle is running but a link in the traveling direction is under regulation.

Steps S730-S770 are realized by processing basically similar to S530-S570 of the regulated lane guide processing (See FIG. 14) at a tollgate, and their description will be omitted.

In S730, the navigation processing part 100 searches the regulated lane display information 192 by using the link ID of the link that has been judged, in S725, to be under regulation, as a search key. If it is not judged in S725 whether the link is under regulation, the link ID of the link that the vehicle is running is used as the key. In S740, the navigation processing part 100 judges whether a link ID 1921 coincident with the link ID of the link that has been judged to be under regulation.

Further, in S750, the navigation processing part 100 obtains a regulated lane position 1923 associated with the link ID 1921 obtained by the search, from the regulated lane display information 192.

Further, in S760, the navigation processing part 100 performs the following processing.

In detail, the navigation processing part instructs the display processing part 106 to display a screen as shown in FIG. 22(A) for example, on the basis of the position (right or left) indicated by the obtained regulated lane position 1923. Further, using the voice input/output unit 22, the navigation processing part 100 outputs voice for notifying the user that the regulated lanes are positioned on the right or left side. Of course, it is possible to output voice for notifying the position of non-regulated lanes.

As shown in FIG. 22(A), the display processing part 106 displays the regulation mark 705 to be superimposed on the road corresponding to the link under traffic regulation, in the map screen 701. Further, the display processing part 106 displays an image that approximately displays the regulated lane position, in the lane guide screen 711.

Here, the image is shown assuming the case where the regulated lane position 1923 is "left", and a trafficable lane mark 730, a regulated lane mark 731 and a direction 715 are displayed being superimposed on a road image 712. The direction 715 is an image that shows the direction to the trafficable lane mark 730 on the opposite side of the regulated lane mark 731. Further, the display processing part 106 displays a message 719 to the effect that regulated lanes exist in the traveling direction.

In the case where the regulated lane position 1923 is "right", the display processing part 106 displays an image as shown in FIG. 22(B), in the lane guide screen 711.

Further, in S770, the navigation processing part 100 performs the following processing.

In detail, the navigation processing part 100 instructs the display processing part 106 to display a screen as shown in FIG. 22(C) in the lane guide screen 711. Further, using the voice input/output unit 22, the navigation processing part 100 outputs voice to inform the user that traffic regulation exists in the traveling direction.

As shown in FIG. 22(C), the display processing part displays a regulation mark 740 superimposed on a road image 712 in the lane guide screen 711. Further, the display processing part 106 displays a message 741 to the effect that traffic regulation exists in the traveling direction.

After performing S760 or S770, the navigation processing part 100 erases the display of the lane guide screen 711 when change of the link that the vehicle is runnning to another link is detected. Thereafter, the flow returns to S725.

Figure 21:
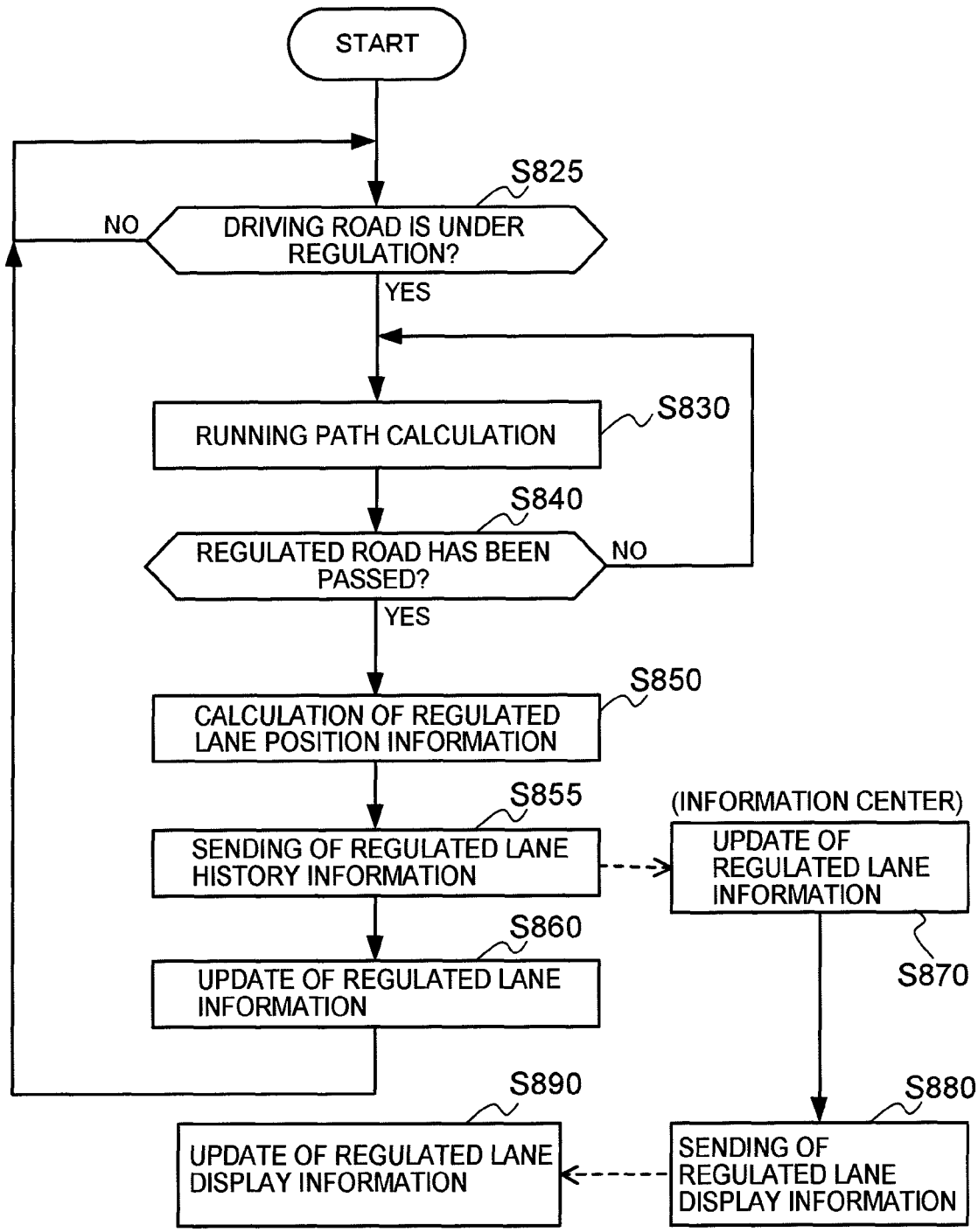
FIG. 21 is a flowchart showing a flow of processing of learning an approximate position of regulated lanes (regulated lane learning processing)
Figure 22:
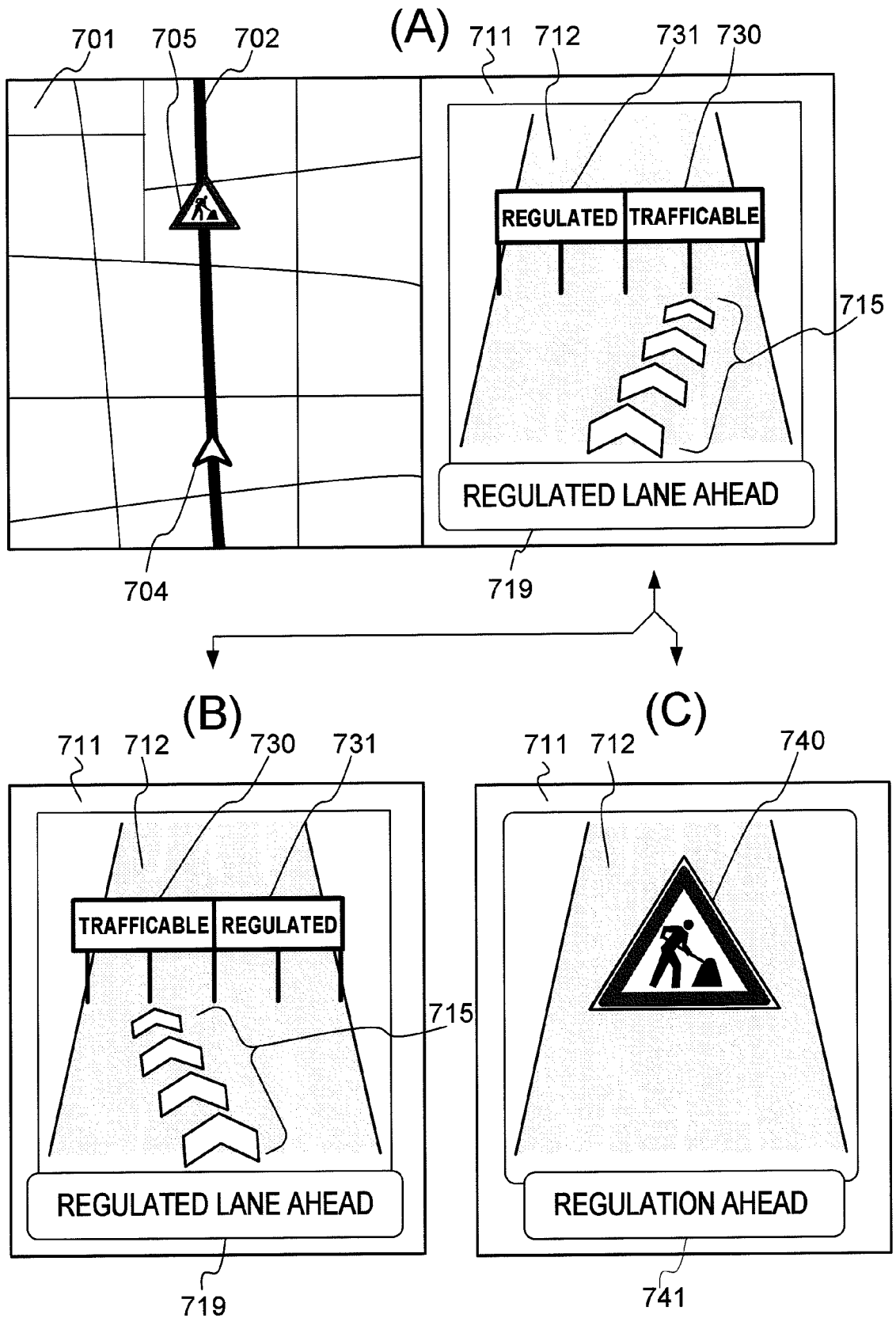
FIG. 22 is a view showing examples of a screen displayed on a display unit.

FIG. 21 is a flowchart showing a flow of processing of learning an approximate position of regulated lanes (the regulated lane learning processing).

The step S825 is similar to S725 (See FIG. 20), and its description will be omitted. Further, the step S830 is similar to S630 (FIG. 15), and its description will be omitted also. Further, while the vehicle is running on the link under traffic regulation, the vehicle running path calculation part 112 calculates a running path.

While the vehicle running path calculation part 112 calculates the running path (S830), the navigation processing part 100 judges whether the vehicle has passed through the road under traffic regulation (S840). In detail, the navigation processing part 100 judges whether the link under traffic regulation that the vehicle is running has changed to another link. In the case where it is judged that the link has changed (YES in S840), and the flow proceeds to S850. On the other hand, in the case where it is judged that the link has not changed (NO in S840), and the flow returns to S830.

When it is judged that the vehicle has passed through the road under traffic regulation (YES in S840), the navigation processing part 100 calculates regulated lane position information by using the running path calculated by the vehicle running path calculation part 112 (S850). In detail, the navigation processing part 100 specifies the lane shift direction (right or left) on the basis of the running path. Then, the navigation processing part 100 specifies the position on the opposite side to the specified direction, as the regulated lane position. Further, the navigation processing part 100 obtains time information calculated by using the information outputted from the GPS receiver 23, as a passage date.

Description will be given taking an example where an actual road is arranged as shown in FIG. 23. As shown in the figure, a road 801 has four lanes. Three lanes on the left side in the traveling direction are regulated lanes 807, and one lane on the right side in the traveling direction is a trafficable lane 808.

In the above-described case, a road 801 that vehicles 851 and 861 are running is under traffic regulation. Further, the running path 852 of the vehicle 851 and the running path 862 of the vehicle 861 deviate from the traveling direction (the link direction) to the right. As a result, it is judged that the regulated lane position is "left".

Here, the lane shift direction may be judged by using information outputted by a sensor that detects a rotation direction and a rotation quantity of the steering wheel. For example, in the case of the running path 862, an approximate position of the regulated lane can be specified by detecting vehicle's shift to the right lane on the basis of steering operations detected at the points c and d or at the points e and f. To estimate that steering operation is operation for lane shift, it is possible to consider time (for example, four seconds) that has elapsed from the start of steering operation until the steering wheel returns to the former state.

Returning to FIG. 21, description will be continued. When the regulated lane position is specified (S850), the navigation processing part 100 sends regulated lane history information to the information center 3 (S855). In detail, the navigation processing part 100 generates regulated lane history information that associates the link ID of the link for which the regulated lane position is specified with the obtained passage date and the regulated lane position, and sends the generated information to the information center 3 through the traffic information collecting part 118. Then, the flow proceeds to S860.

After the sending of the regulated lane history information (S855), the navigation processing part updates the regulated lane information 19 (S860). In detail, the navigation processing part 100 stores the generated regulated lane history information, as the regulated lane history information 191. Then, the navigation processing part 100 determines one regulated lane position by a prescribed method (for example, a method that selects a position included in the most pieces of information stored) on the basis of the regulated lane position 1913 of the link for which the lane shift has occurred. Then, the navigation processing part 100 associates the link ID 1921 with the determined regulated lane position 1923, and adds the associated information to the regulated lane display information. In the case where the lane display information of the corresponding link has been already stored, it is sufficient to update only the regulated lane position 1923. After performing the above processing, the flow returns to S825.

On the other hand, when the information center 3 receives the regulated lane history information, the information center 3 updates the regulated lane information 32 (S870). In detail, first the information center 3 stores the received regulated lane history information, as the regulated lane history information 321. Then, the information center 3 generates regulated lane display information 322 based on the regulated lane history information 321. The method of storing the regulated lane history information 321 and the method of generating the regulated lane display information are similar to those in S860.

When the regulated lane information is updated (S870), the information center 3 sends (delivers) the regulated lane display information 322 (S880). As for the timing of the delivery, the delivery may be performed at prescribed time intervals or when a request is received from the navigation device 1.

Receiving the regulated lane display information 322, the traffic information collecting part 118 updates the regulated lane display information 192 (S890). In detail, the traffic information collecting part 118 adds the received regulated lane display information 322 to the regulated lane display information 192. In the case where the regulated lane display information 192 corresponding to the received regulated lane display information 322 has been already stored, only the regulated lane position 1923 is updated.

As described above, the regulated lane learning processing (FIG. 21) is performed.

It is possible that the regulated lane display information is sent not only from the information center 3 but also from other vehicles 4. In that case, for example when the road that the vehicle is running is judged to be under regulation, the traffic information collecting part 118 obtains the regulated lane display information from other vehicles 4 running in the neighborhood of its own vehicle through the inter-vehicle communication unit 28.

Hereinabove, the third embodiment of the present invention has been described. According to the third embodiment, information on regulated lanes is automatically generated even if the information has not been previously prepared by human works. As a result, the navigation device can guide the vehicle to a lane to run to avoid the regulated lanes, even if the navigation device uses map data that does not include information on the regulated lanes or sufficient information on the regulated lanes.

Further, the information center accumulates history of regulated lane position information calculated by a plurality of vehicles with respect to a same link, and analyzes the accumulated information statistically. As a result, it is possible to improve the accuracy of the regulated lane position used for guidance.

Further, since the regulated lane information is delivered from the information center, it is possible to inform the regulated lane position even for a road that a user's vehicle passes for the first time.

Hereinabove, the present invention has been described taking exemplary embodiments. Many substitutes, modifications and variations are obvious to a person skilled in the art. Thus, the above-described embodiments of the present invention are intended to exemplify the gist and the range of the present invention, not to limit the invention.

For example, the first through third embodiments can be combined suitably. Thus, for example, the navigation device 1 may be arranged so that it informs a user one or more of ETC lanes, conventional lanes, regulated lanes at a tollgate, and regulated lanes on a road.

Further, the navigation device 1 may be connected with an in-vehicle sensor such as a camera. Then, the control unit 10 performs image recognition processing by using information sent from the in-vehicle sensor. By this arrangement, the navigation device 1 can recognize a road sign, a mark painted on a road surface (a road marking) or the like by image recognition, to detect an ETC lane position, a conventional lane position, a regulated lane position, a lane shift direction, or the like.

Further, it is possible to arrange that the navigation device recognize an obstacle on a road, such as a puddle, a fallen object, or the like. And, the navigation device 1 sends information on such an obstacle to the information center 3. By this arrangement, it is possible to generate traffic regulation information even if the information center 3 does not register traffic regulation information with respect to a road on which an obstacle has been found. Further, it is possible that the navigation device 1 sends position information on a lane in which an obstacle exists in addition to information on the obstacle itself to the information center 3. By this arrangement, the information center 3 can generate the tollgate lane display information and the regulated lane display information.

Further, it is possible to store characteristic running path patterns for specifying lane shift previously in a database, and the navigation device 1 and the information center 3 hold the database previously. By this arrangement, it is possible to detect lane shift and the shift direction more accurately. Further, it is possible to reduce possibility that a running path different from lane shift is detected erroneously as lane shift.

The invention claimed is;

1. A navigation device comprising:
a calculation part, which calculates an approximate position of an unknown lane of a prescribed kind to the traveling direction, based on change of a position of a vehicle;
a storage part, which stores the approximate position of the lane, for later reference to provide guidance during subsequent travel; and
an output part, which during subsequent travel, obtains the approximate position of the lane from the storage part, and outputs the obtained approximate position to provide guidance regarding the lane.

2. A navigation device of claim 1, further comprising:
an electronic toll collection (ETC) signal receiving part, which receives an ETC signal indicating that the navigation device has communicated with an ETC system placed in an ETC lane;
the calculation part calculates an approximate position of the ETC lane based on change of a position of the vehicle when the ETC signal is received, for later reference to provide guidance during subsequent travel; and
the output part obtains, during subsequent travel, an approximate position of an ETC lane at a designate tollgate, and outputs the obtained approximate position.

3. A navigation device of claim 1, wherein:
the navigation device further comprises a traffic information receiving part, which receives information on traffic regulation of a road;
when a road that the vehicle runs is regulated under traffic regulation, the calculation part calculates, based on change of a position of the vehicle, an approximate position of a lane that is not regulated under traffic regulation and also calculates at least one other lane different from the calculated approximate position as an approximate position of a lane that is regulated under traffic regulation, for later reference to provide guidance during subsequent travel; and
the output part obtains, during subsequent travel, the approximate position of the lane that is regulated under traffic regulation, and outputs the obtained approximate position.

4. A navigation device of claim 1, wherein:
the approximate position is information including "right" or "left".

5. A navigation device of claim 4, wherein:
the output part uses the approximate position of the lane to display a guide screen that indicates a traveling direction to the lane in question is right or left.

6. A navigation device of claim 5, wherein:
the output part display a guide screen that comprises a figure of lanes on right and left side with respect to the traveling direction, and a figure for leading to a lane corresponding to the approximate position between the lanes.

7. A navigation device of claim 6, wherein:
the output part uses the approximate position of the lane to output voice for informing that a traveling direction to the lane in question is right or left.

8. A navigation device of claim 1, wherein:
change of a position of the vehicle is a running path of the vehicle; and
the calculation part calculates the approximate position of the lane such that the approximate position is located in a direction in which the running path has deviated from a link corresponding to a road that the vehicle runs.

9. A navigation device comprising:
a calculation part, which calculates an approximate position of an unknown lane of a prescribed kind to the traveling direction, based on change of a position of a vehicle;
a lane position sending part, which sends the approximate position of the lane to a prescribed external apparatus;
a lane position receiving part, which receives an approximate position of the lane from the prescribed external apparatus;
a storage part, which stores the calculated approximate position of the lane and the received approximate position of the lane, for later reference to provide guidance during subsequent travel; and
an output part, which during subsequent travel, obtains the stored approximate position of the lane from the storage part, and outputs the obtained approximate position, to provide guidance regarding the lane.

10. A lane guide method for a navigation device, wherein: the navigation device performs:
a calculation step which calculates an approximate position of an unknown lane of a prescribed kind to the traveling direction, based on change of a position of a vehicle;
a storage step, in which the approximate position of the lane is stored for later reference to provide guidance during subsequent travel; and
an output step, in which during subsequent travel, the approximate position of the lane, which is obtained in the storage step, is obtained and outputted to provide guidance regarding the lane.

* * * * *